(12) United States Patent
Sugiyama et al.

(10) Patent No.: US 6,792,901 B2
(45) Date of Patent: Sep. 21, 2004

(54) CONTROL SYSTEM OF INTERNAL COMBUSTION ENGINE

(75) Inventors: Takanobu Sugiyama, Yokohama (JP); Shunichi Aoyama, Kanagawa (JP); Shinichi Takemura, Yokohama (JP); Tsuneyasu Nohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/147,961

(22) Filed: May 20, 2002

(65) Prior Publication Data

US 2002/0189602 A1 Dec. 19, 2002

(30) Foreign Application Priority Data

Jun. 14, 2001 (JP) ........................................ 2001-179630

(51) Int. Cl.[7] .................................................. F01L 1/34
(52) U.S. Cl. ..................... 123/90.15; 123/692; 123/673
(58) Field of Search .................................. 123/673, 679, 123/672, 692, 90.15, 90.16, 90.17, 90.18

(56) References Cited

U.S. PATENT DOCUMENTS

| | | | | |
|---|---|---|---|---|
| 4,960,095 A | * | 10/1990 | Koike et al. ............... | 123/90.16 |
| 5,060,604 A | * | 10/1991 | Seki et al. ................ | 123/90.16 |
| 5,377,654 A | * | 1/1995 | LoRusso et al. ............ | 123/673 |
| 5,606,960 A | * | 3/1997 | Takahashi et al. ........ | 123/90.15 |
| 6,050,250 A | * | 4/2000 | Kerkau ........................ | 123/692 |
| 6,202,415 B1 | * | 3/2001 | Lohmann et al. ........... | 123/692 |
| 6,213,068 B1 | * | 4/2001 | Hassdenteufel .......... | 123/90.15 |
| 2002/0104520 A1 | * | 8/2002 | Nakasaka et al. ........... | 123/673 |

FOREIGN PATENT DOCUMENTS

| | | |
|---|---|---|
| JP | 11-082073 | 3/1999 |
| JP | 2000-234533 | 8/2000 |

* cited by examiner

*Primary Examiner*—Erick Solis
(74) *Attorney, Agent, or Firm*—Foley & Lardner LLP

(57) ABSTRACT

A control system of an internal combustion engine is comprised of an operation angle adjustment mechanism which continuously varies an operation angle of intake valves of the engine, an air-fuel ratio detector which detects an exhaust parameter indicative of air-fuel ratio information, and a control unit which are coupled to the operation angle adjustment mechanism and the air-fuel ratio detector. The control unit feedback-controls an air-fuel ratio of the engine on the basis of the exhaust parameter and corrects the operation angle on the basis of the exhaust parameter.

21 Claims, 20 Drawing Sheets

CONTROL SYSTEM OF INTERNAL COMBUSTION ENGINE

BACKGROUND OF THE INVENTION

The present invention relates to an internal combustion engine which comprises an operation angle adjustment mechanism for continuously varying an operation angle of intake valves, and more particularly to an engine control system which easily and accurately corrects the operation angle of the intake valves.

Japanese Patent Provisional Publication No. 2000-234533 discloses a control system for continuously varying an operation angle (a valve opening duration) of intake valves of an internal combustion engine and for continuously varying an opening phase of the intake valves relative to a crank angle.

SUMMARY OF THE INVENTION

However, if such a control system is employed in an internal combustion engine having a plurality of cylinder trains such as a V-type internal combustion engine, it is necessary to strictly equalize initial operational properties of intake valves between the cylinder trains so as to prevent degradations of an engine operational stability and an energy consumption. Such an accurate initial setting of the engine requires difficult and complicated procedures.

It is therefore an object of the present invention to provide a control system of an engine control system which improves an engine performance by accurately correcting an operation angle of intake valves without complicating the control system.

Another object of the present invention is to provide an internal combustion engine which improves an engine operational stability and an energy consumption by eliminating a variation between operation angles of a plurality of cylinder trains.

A further another object of the present invention is to provide an improved internal combustion engine which certainly prevents interference between a piston and intake valves during a correcting operation of an operation angle of the intake valves.

An aspect of the present invention resides in a control system of an internal combustion engine which comprises an operation angle adjustment mechanism which continuously varies an operation angle of intake valves of the engine, an air-fuel ratio detector which is disposed in an exhaust passage of the engine and detects an exhaust parameter indicative of air-fuel ratio information, and a control unit which is coupled to the operation angle adjustment mechanism and the air-fuel ratio detector. The control unit is programmed to feedback-control an air-fuel ratio of the engine on the basis of the exhaust parameter and to correct the operation angle on the basis of the exhaust parameter.

Another aspect of the present invention resides in a method for controlling an internal combustion engine with an operation-angle adjustment mechanism for continuously varying an operation angle of an intake valve and an air-fuel ratio detector for detecting an exhaust parameter indicative of air-fuel ratio information. The method comprises a step of feedback-controlling an air-fuel ratio of the engine on the basis of the exhaust parameter; and a step of correcting the operation angle on the basis of the exhaust parameter.

The other objects and features of this invention will become understood from the following description with reference to the accompanying drawings.

DETAILED DESCRIPTION OF THE INVENTION

Hereinafter, there will be explained preferred embodiments of a control system of a V-type internal combustion engine according to the present invention in detail, with reference to drawings.

Referring to FIGS. 1 through 10, there is shown a first embodiment of the control system of the V-type internal combustion engine according to the present invention.

Figure 1:
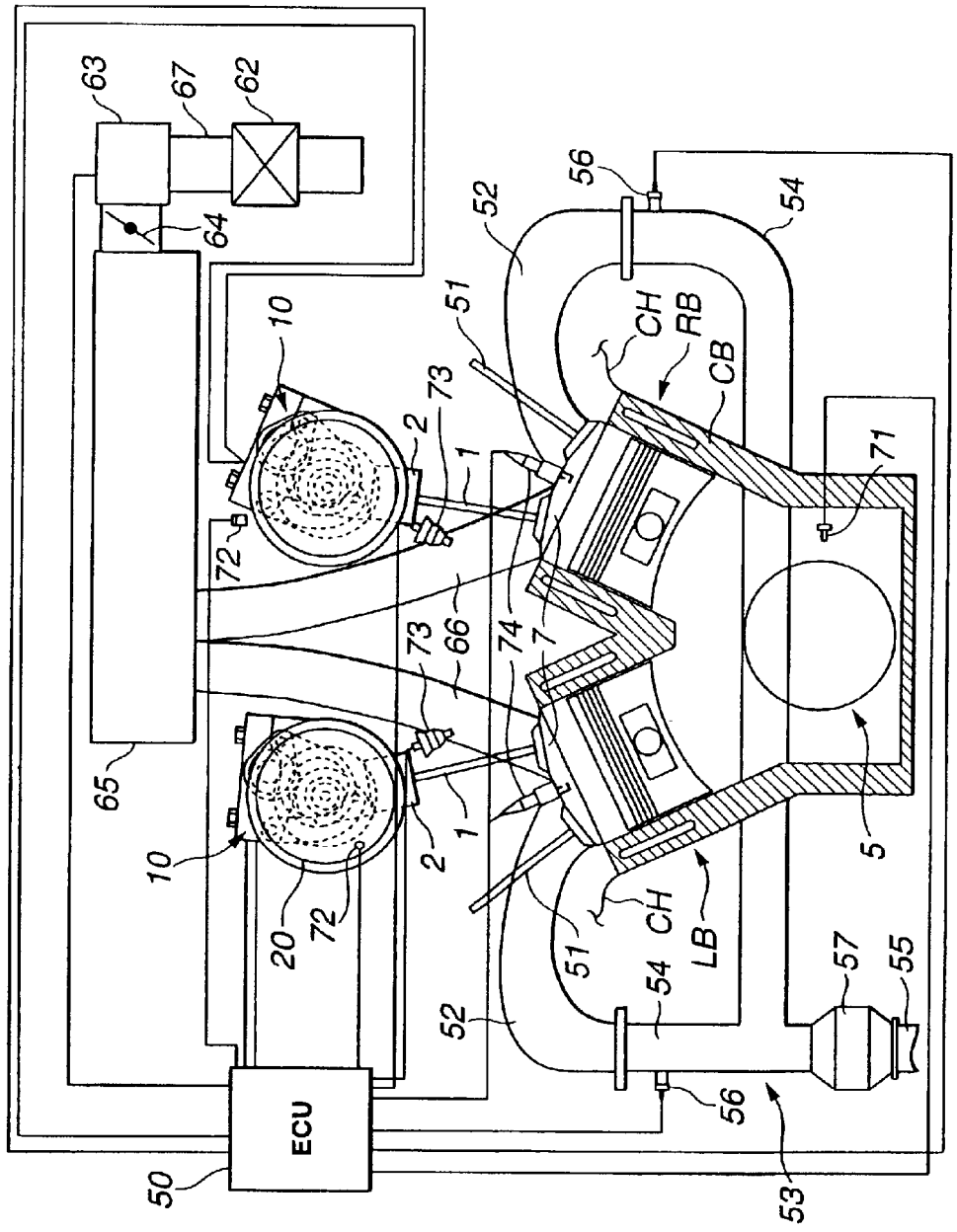
FIG. 1 is a schematic view showing a control system of an internal combustion engine of a first embodiment according to the present invention.

As shown in FIG. 1, the V-type internal combustion engine comprises a pair of cylinder trains corresponding to a right bank RB and a left bank LB which are arranged into a V-shape. More specifically, the engine comprises one cylinder block CB to which two cylinder heads CH are fixed. These two cylinder heads CH correspond to right and left banks RB and LB. In each of right and left banks RB and LB, there are provided an operation angle adjustment mechanism 10 which is capable of continuously varying an operation angle (valve open duration) of intake valves and a phase adjustment mechanism 20 which is capable of continuously varying a phase (such as a center phase) of the operation angle of intake valves 1 relative to the rotational phase of a crankshaft 5.

An exhaust system of the V-type internal combustion engine comprises exhaust ports 52 provided in cylinder heads CH, respectively, and exhaust manifolds 53 attached to cylinder heads CH, respectively. Each exhaust port 52 is connected to a combustion chamber of each cylinder, and the communication between exhaust port 52 and the combustion chamber is controlled by properly opening and closing exhaust valves 51 provided for each cylinder. Exhaust manifold 53 comprises two exhaust branch passages 54 and an exhaust-gas collecting portion 55 to which two exhaust branch passages 54 are connected.

An air-fuel ratio sensor 56 is provided at each exhaust branch passage 54 and functions as exhaust gas detecting means for detecting an exhaust parameter of each cylinder train by checking the exhaust gas discharged from several cylinders of each cylinder train. In this first embodiment, an $O_2$ sensor, which changes its output at a slice level is employed as air-fuel ratio sensor 56. A catalyst 57 for purifying exhaust gas is disposed in exhaust-gas collecting portion 55.

In an intake system of the V-type engine, there are provided each intake valve 1 for each intake port 66 connected to each combustion chamber 7 of each cylinder. An intake-air collector 65 is disposed upstream of intake ports 66. An intake air passage 67 is connected to an upstream end of intake-air collector 65. An air cleaner 62, an airflow meter 63 for detecting an intake air quantity and a throttle valve 64 for controlling the intake air quantity are provided in intake air passage 67 in the order of mention.

An ECU (Engine Control Unit) 50 comprises a memory and a CPU, and executes the controls of operation-angle adjustment mechanisms 10 and phase adjustment mechanisms 20 according to an engine speed, a load and a water temperature, a vehicle speed, and etc. detected by sensors. Further, ECU 50 executes a common engine control including an ignition timing control and a fuel injection control. More specifically, ECU 50 receives signals indicative of the engine operating condition from air-fuel ratio sensors 56, airflow meter 63, a crank angle sensor 71 for detecting a revolution speed of crankshaft 5, two drive-shaft angle sensors 72 for detecting phases of the respective intake cam shafts, and the like, which are electrically coupled to ECU 50. Further, ECU 50 controls the operations of fuel injectors 73 for injecting fuel into each intake port 66, each spark plug 74 for each combustion chamber 7, operation-angle adjustment mechanisms 10 and phase adjustment mechanisms 20 on the basis of the detected signals indicative of the engine operating condition.

Figure 2:
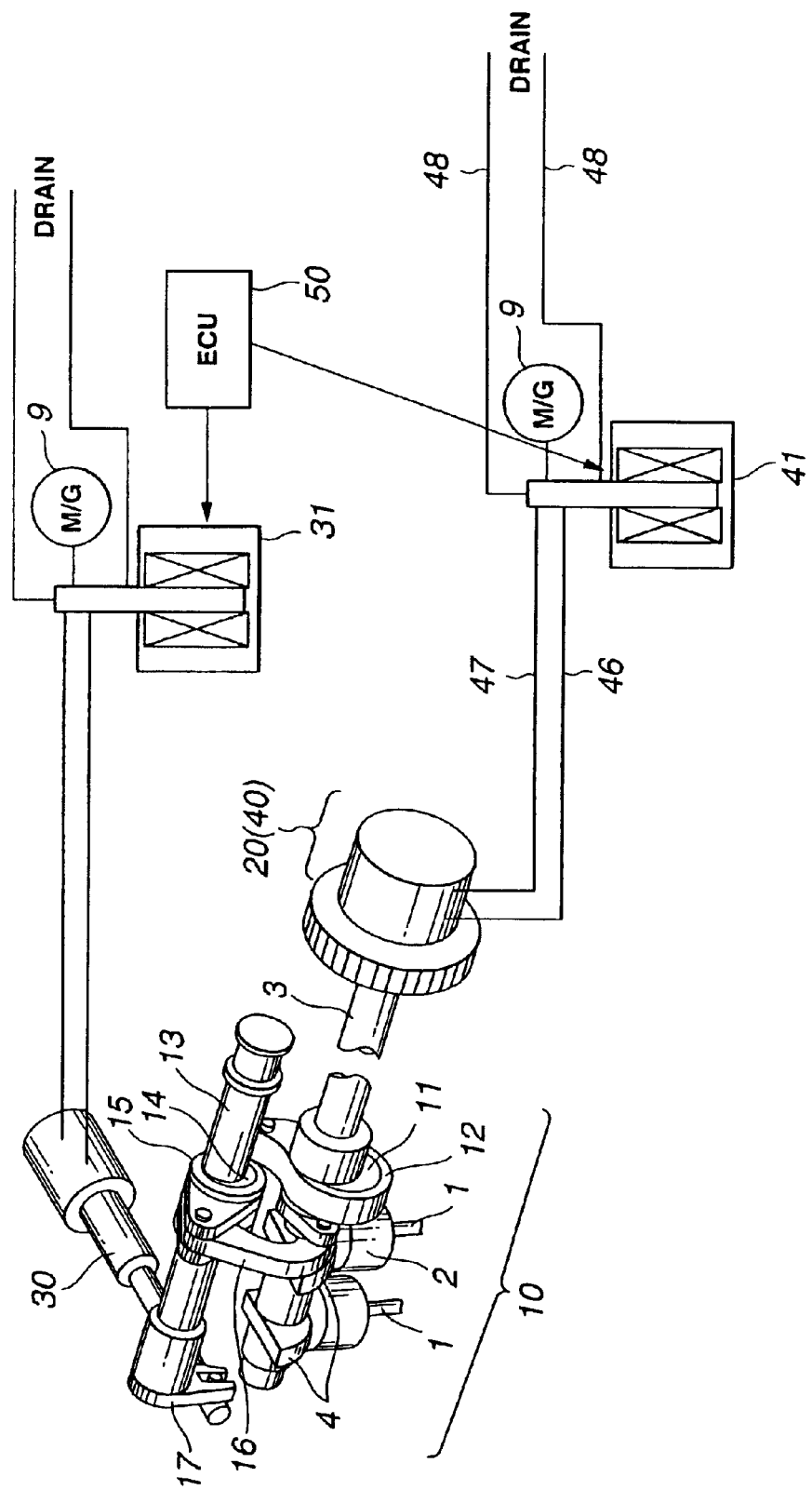
FIG. 2 is a schematic perspective view showing an operation angle adjustment mechanism of FIG. 1.

With reference to FIG. 2, a construction of operation-angle adjustment mechanism 10 will be discussed.

A drive shaft 3 of each operation-angle adjustment mechanism 10 is disposed above the valve lifters 2 of the respective intake valves 1 of each bank and extends along the aligned direction of each cylinder train. Each drive shaft 3 is rotatably supported by each cylinder head CH and is rotated by the rotational force transmitted from crankshaft 5 while interlocking with crankshaft 5. Swing cams 4 for respectively pushing valve lifters 2 of intake valves 1 are rotatably attached on drive shaft 3. An eccentric cam 11 of each cylinder is fixed to or integrally formed with drive shaft 3. An axial center of an outer periphery of eccentric cam 11 is eccentric from an axial center of drive shaft 3. A first link 12 of a ring-shape is rotatably connected with an outer periphery of eccentric cam 11.

A control shaft 13 is rotatably supported by cylinder head CH so as to be parallel with drive shaft 3. A control cam 14 for each cylinder is fixed to or integrally formed with control shaft 13. An axial center of an outer periphery of control cam 14 is eccentric from an axial center of control shaft 13. A center portion of a locker arm 15 is rotatably connected with the outer periphery of control cam 14. An end portion of locker arm 15 is rotatably interlocked with an end portion of first link 12, and the other end portion of locker arm 15 is rotatably interlocked with an end portion of a rod-shaped second link 16. The other end portion of second link 16 is rotatably interlocked with an end portion of the pair of swing cams 4.

Accordingly, by rotating drive shaft 3 according to the rotation of crankshaft 5, first link 12, which rotatably connected with eccentric cam 11, moves in an approximately translational direction, that is, makes an approximately translational motion. This translational motion of first link 12 is converted into a swing motion of locker arm 15, and therefore the pair of swing cams 4 are swung through second link 16. These swing cams 4 are in contact with and push valve lifters 2 of intake valves 1, respectively, so that intake valves 1 are opened against a valve spring (not shown) and closed according to the swing motion of swing cams 4.

By rotating control shaft 13 according to the operation of an actuator 30 independent from the rotation due the rotational power of crankshaft 5, the center position of control cam 14, which position acts as a swing center of locker arm 15, is varied. According to this change of the center position, the statues of locker arm 15, first and second links 12 and 16 are changed, and therefore the swing characteristics of swing cams 4 such as the phase and the swing angle are changed. In reply to these changes of the swing characteristics, both of the operation angle and the valve lift quantity of intake valves 1 are continuously varied. The operation of operation-angle adjustment mechanism 10 hardly affects a phase center of the operation angle of intake valves 1 relative to the rotational phase of crankshaft 5.

Since operation-angle adjustment mechanism 10 is arranged such that swing cams 4 for opening and closing intake valves 1 are coaxially provided on drive shaft 3, no axial misalignment causes between swing cams 4 and drive shaft 3. Therefore, this operation-angle adjustment mechanism 10 performs high control accuracy. Further, since this mechanism 10 is arranged such that locker arm 15 and first and second links 12 and 16 are concentratedly disposed in the vicinity of drive shaft 3, this mechanism 10 is compactly designed and is easily installed in an internal combustion engine. Further, in this mechanism 10, a lot of interlocking portions such as a bearing portion between eccentric cam 11 and first link 12 and a bearing portion between control cam 14 and locker arm 15 are configured into a sliding surface contacting structure (surface contact). Accordingly, these interlocking portions can be easily lubricated and perform a high durability and a high reliability. Further, even when this mechanism 10 is adapted to a common fixed-type valve system, the change of layout of the common fixed-type valve system is easily executed by arranging swing cams 4 and drive shaft 3 at position of fixed cams and a camshaft. That is, it is very easy to install this mechanism 10 in the common fixed-type valve system.

Figure 3:
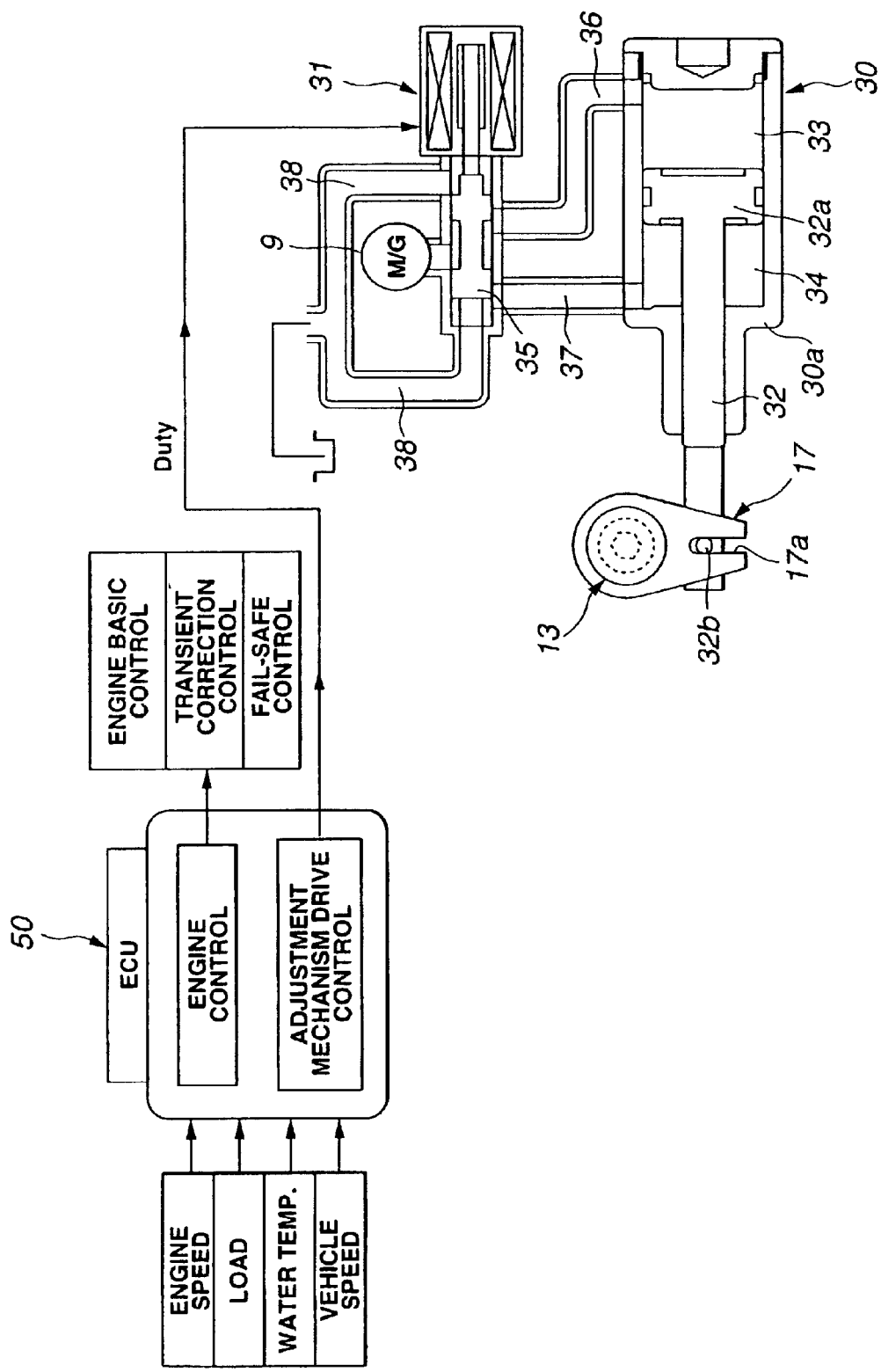
FIG. 3 is a schematic view showing an actuator for the operation angle adjustment mechanism.

As shown in FIG. 3, actuator 30 comprises a cylinder 30*a* and a piston 32. A pressure receiving portion of piston 32 is disposed in cylinder 30*a* and defines an inner space of cylinder 30*a* into a first hydraulic chamber 33 and a second hydraulic chamber 34. A pin 32*b* is provided at an end portion of piston 32 and is slidably connected with a groove 17*a* of disc 17 provided at an end portion of control shaft 13. Accordingly, by forwardly and backwardly moving piston 32 according to the controlled supply of hydraulic pressure to first and second hydraulic chambers 33 and 34, control shaft 13 is rotated through pin 32*b* and disc 17, and therefore the operation angle of intake valves 1 is varied.

Hydraulic pressure supplied to first and second hydraulic pressure chambers 33 and 34 is controlled by changing a position of spool 35 of a solenoid valve 31. Solenoid valve 31 is duty-controlled by ECU 50. More specifically, ECU 50 outputs an output signal indicative of a duty ratio to solenoid valve 31. That is, by varying the output signal indicative of the duty ratio according to the operating condition of the internal combustion engine, the position of spool 35 is varied.

When spool 35 is positioned at a rightmost position as shown in FIG. 3, first hydraulic chamber 33 is fluidly communicated with a hydraulic pump 9 through a first hydraulic passage 36, and second hydraulic chamber 34 is fluidly communicated with a drain passage 38 through a second hydraulic passage 37. Therefore, under this rightmost state of spool 35, piston 32 of actuator 30 is pushed and moved toward the left hand side in FIG. 3. On the other hand, when spool 35 is positioned at a leftmost position in FIG. 3, first hydraulic chamber 33 is fluidly communicated with drain passage 38 through first hydraulic passage 36, and second hydraulic chamber 34 is fluidly communicated with hydraulic pump 9 through second hydraulic passage 37. Therefore, under this leftmost state of spool 35, piston 32 of actuator 30 is pushed and moved toward the right hand side in FIG. 3. Further, when speed 35 is positioned at an intermediate position, ports of first and second hydraulic passages 36 and 37 are closed by spool 35. Therefore, under this intermediate state of spool 35, the hydraulic pressures in first and second hydraulic chambers 33 and 34 are maintained, and therefore piston 32 stays at its present position.

Thus, by properly moving and staying piston 32 of actuator 30 at a proper position, the operation angle of intake valves 1 is varied and maintained at a desired angle within a predetermined control range. That is, this operation-angle adjustment mechanism 10 ensures a high degree of freedom in control while maintaining a simple structure.

Next, with reference to FIG. 4, the construction of phase adjustment mechanisms 20 and a phase varying actuator 40 employed therein will be discussed.

A cam sprocket (or cam pulley) 6 is coaxially provided at a front end portion of drive shaft 3. Cam sprocket 6 is rotated in synchronization with the rotation of crankshaft 5. Phase adjustment mechanism 20 comprises an outer cylinder portion 21, an inner cylinder portion 23 and a ring-shaped piston 42. Outer cylinder portion 21 is integrally formed with an inner periphery of cam sprocket 6. Inner cylinder portion 23 is fixed to drive shaft 3 through a hollow bolt 22 and integrally rotates together with drive shaft 3. Piston 42 is disposed between outer cylinder portion 21 and an inner cylinder portion 23.

Helical splines are formed on inner and outer surfaces of piston 42, and an engaging portion 25 which is engaged with an outer surface of inner cylinder portion 23 and an inner surface of outer cylinder portion 21. Therefore, by moving piston 41 along an axial direction of inner and outer cylinder portions 23 and 21 (corresponding to the right and left direction in FIG. 4), the axial motion of piston 42 is converted into a relative rotational motion between inner cylinder portion 23 and outer cylinder portion 21, and therefore a relative rotational phase between outer cylinder portion 21 and inner cylinder portion is continuously varied. This varies a relative rotational phase of drive shaft 3 relative to cam sprocket 6, and therefore the phase of the operation angle of intake valves 1 is continuously varied without varying the operation angle.

With this arrangement, phase adjustment mechanism 20 is made compact and is preferably installed in the internal combustion engine. Further, it is possible to suppress the number of parts of phase adjustment mechanism 20. Furthermore, phase adjustment mechanism 20 is easily arranged in the internal combustion engine without arising interference relative to operation-angle adjustment mechanism 10.

Figure 4:
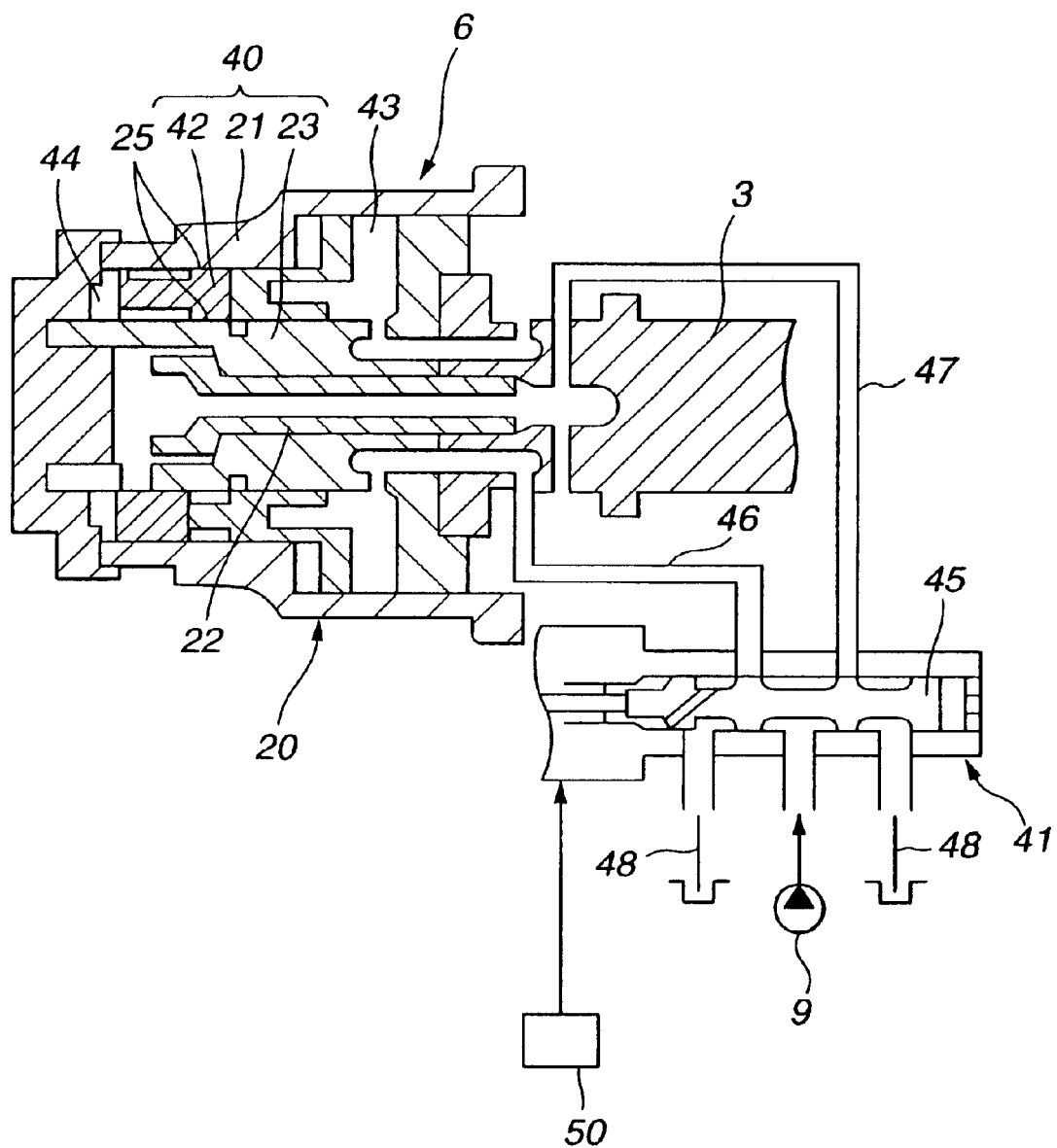
FIG. 4 is a cross sectional view showing a phase adjustment mechanism.

As shown in FIG. 4, phase varying actuator 40 comprises outer cylinder portion 21, inner cylinder portion 23 and piston 42. Piston 42 defines a space between outer and inner cylinder portions 21 and 23 into first and second hydraulic chambers 43 and 44. By properly controlling hydraulic pressures supplied respectively to first and second hydraulic chamber 43 and 44, piston 42 is moved along the axial direction of outer and inner cylinder portions 21 and 23.

Hydraulic pressures supplied to first and second hydraulic pressure chambers 43 and 44 are controlled by varying a position of a spool 45 disposed in a solenoid valve 41. Solenoid valve 41 is duty-controlled by ECU 50. More specifically, ECU 50 outputs an output signal indicative of a duty ratio to solenoid valve 41. That is, by varying the output signal indicative of the duty ratio according to the operating condition of the internal combustion engine, the position of spool 45 is varied.

When spool 45 is positioned at a leftmost position in FIG. 4, first hydraulic chamber 43 is fluidly communicated with a hydraulic pump 9 through a first hydraulic passage 46, and second hydraulic chamber 44 is fluidly communicated with a drain passage 48 through a second hydraulic passage 47. Therefore, under this leftmost state of spool 45, piston 42 of actuator 40 is pushed and moved toward the left hand side in FIG. 4. On the other hand, when spool 45 is positioned at a rightmost position in FIG. 4, first hydraulic chamber 43 is fluidly communicated with drain passage 48 through first hydraulic passage 46, and second hydraulic chamber 44 is fluidly communicated with hydraulic pump 9 through second hydraulic passage 47. Therefore, under this rightmost state of spool 45, piston 42 of actuator 40 is pushed and moved toward the right hand side in FIG. 4. Further, when speed 45 is positioned at an intermediate position as shown in FIG. 4, ports of first and second hydraulic passages 46 and 47 are closed by spool 45. Therefore, under this intermediate state of spool 45, the hydraulic pressures in first and second hydraulic chambers 43 and 44 are maintained, and therefore, piston 42 stays (locked) at its present position.

Thus, by properly moving and staying piston 42 of actuator 40 at a proper position, the phase center position of the operation angle of intake valves 1 is varied and maintained at a desired position within a predetermined control range. That is, this phase adjustment mechanism 20 ensures a high degree of freedom in control while maintaining a simple structure.

Next, with reference to timing charts shown in FIGS. 5 and 6, there will be discussed an outline of the correction control of the operation angle of intake valves 1 employed in the first embodiment according to the present invention.

Figure 5:
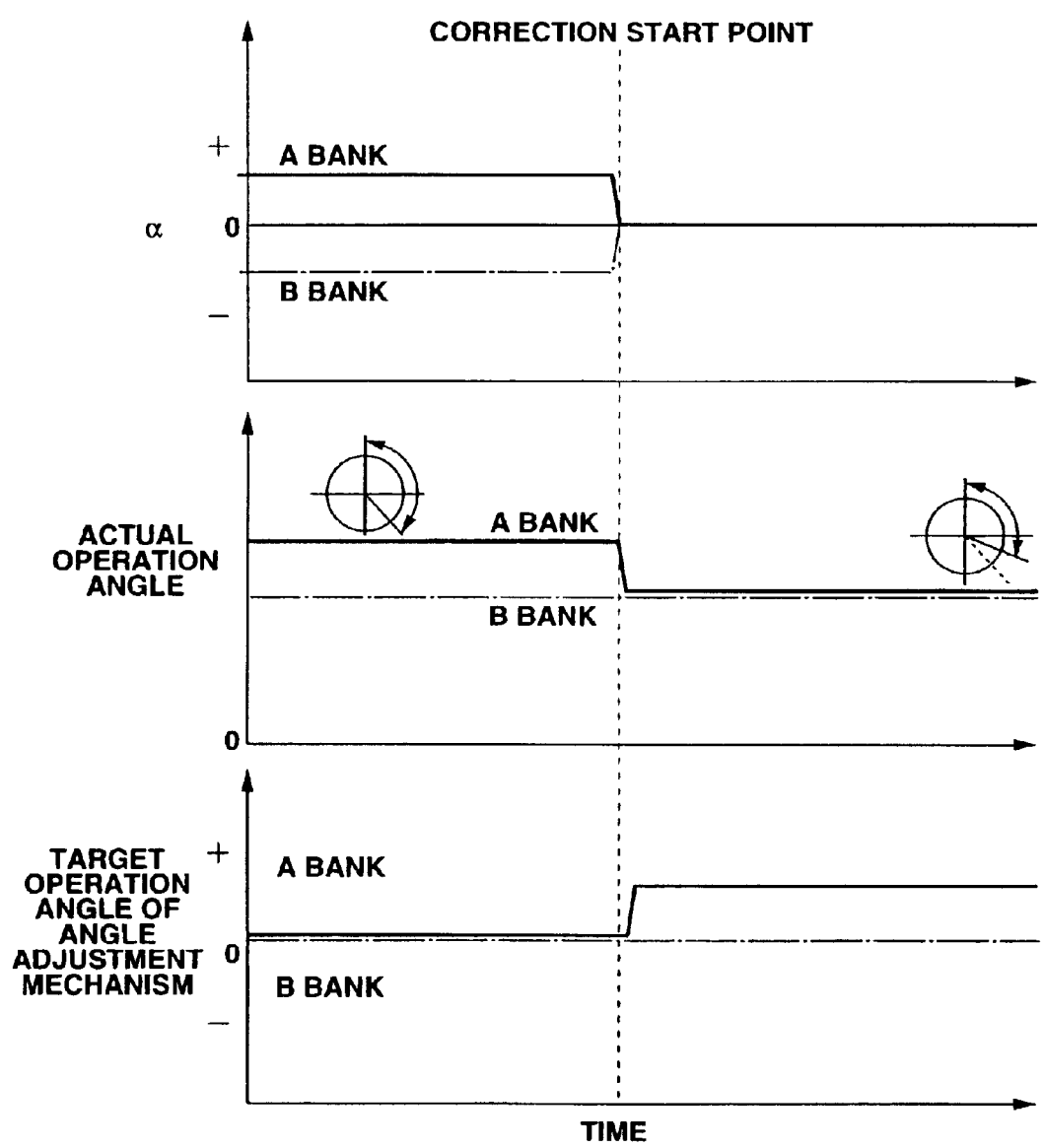
FIG. 5 is time charts showing the flow of the control in the first embodiment.
Figure 6:
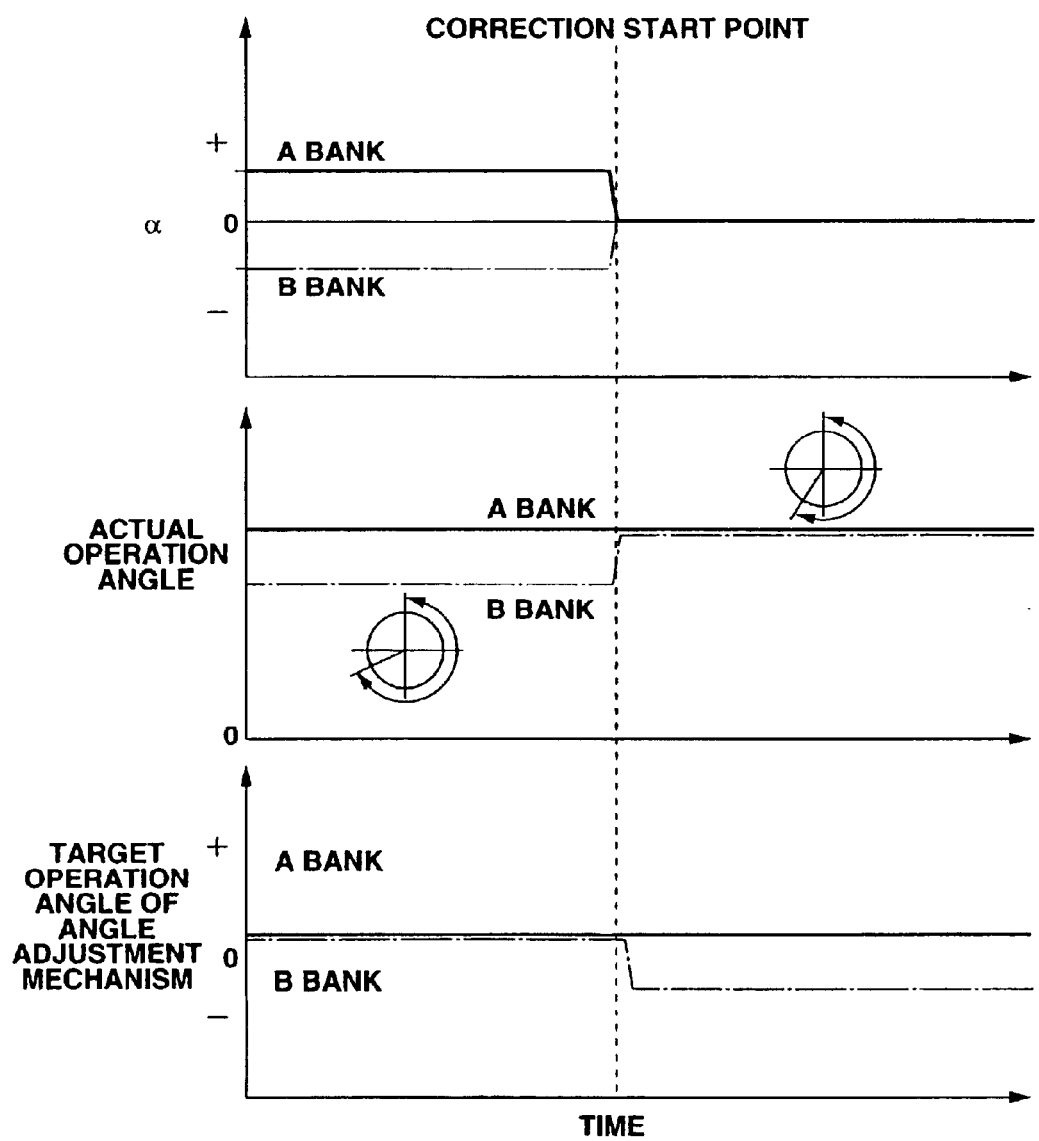
FIG. 6 is another time charts showing the flow of the control.

In the explanation of FIGS. 5 and 6, one of right and left banks RB and LB is called A bank, and the other is called B bank. Further, air-fuel ratio sensor 56 employed in the first embodiment is a common $O_2$ sensor.

In case that the direct drive type operation-angle adjustment mechanism 10 shown in FIG. 1 is employed in the internal combustion engine, there is a possibility that the operation angle of one of right and left banks RB and LB becomes different from the operation angle of the other due to the sum of tolerances of swing cam 4, valve lifter 2 and the like, although such adjustment mechanism 10 is capable of continuously varying the operation angle of intake valves 1 without complicating the structure thereof. Such a difference between the operation angles of right and left banks RB and LB may generate differences in intake air quantities, air-fuel ratios and torques of right and left banks RB and LB, and may degrade the operational stability of the internal combustion engine.

In order to eliminate this possibility as to the degradation of the engine operational stability, the first embodiment according to the present invention is arranged such that the feedback control of the air-fuel ratio is executed by each bank on the basis of the exhaust parameter detected by air-fuel ratio sensor 56 provided by each bank. With this air-fuel ratio feedback control by each bank, the above-discussed possibility as to the degradation of the engine operational stability due to the difference of the air-fuel ratios of right and left banks is firmly eliminated.

Further, the correction control of the operation angle of intake valves 1 is executed under a condition that the feedback control of the air-fuel ratio is being executed. More specifically, During the feedback control of the air-fuel ratio, fuel correction quantities (feedback quantities) $\alpha R$ and $\alpha L$ of right and left banks RB and LB are respectively calculated, and a bank whose operation angle of intake valves 1 is greater than that of the other bank is estimated on the basis of fuel correction quantities $\alpha R$ and $\alpha L$, and the operation angle of the larger-angle side bank is decreased stepwise by a predetermined small quantity $\Delta A$. Further, when fuel correction quantities $\alpha R$ and $\alpha L$ of right and left banks RB and LB are approximately equalized, it is determined that the operation angles of right and left banks are approximately equalized, and the correction control of the operation angle is terminated.

As a result, as shown in FIGS. 5 and 6, even though target control values of the respective operation angles, that is, target operation angles right and left banks RB and LB are different with each other, actual operation angles of right and left banks RB and LB are set at an approximately equal value. Accordingly, the intake air quantities of right and left banks RB and LB are approximately equalized, and fuel correction quantities $\alpha R$ and $\alpha L$ for the basis fuel injection quantity are approximately equalized.

Subsequently, the control executed in the first embodiment will be explained in detail with reference to flowcharts executed by ECU 50.

A main routine for the control will be discussed with reference to FIG. 7.

At step S101, ECU 50 executes a correction flag setting subroutine wherein ECU 50 sets a correction flag indicative whether a correction of the operation angle (a valve opening duration) for intake valves 1 is executed or not.

At step S102, ECU 50 determines whether the correction flag is set at on-state or not on the basis of the content of the set correction flag. When the determination at step S102 is affirmative, the routine proceeds to step S103. When the determination at step S102 is negative, the routine proceeds to an end block.

Figure 9:
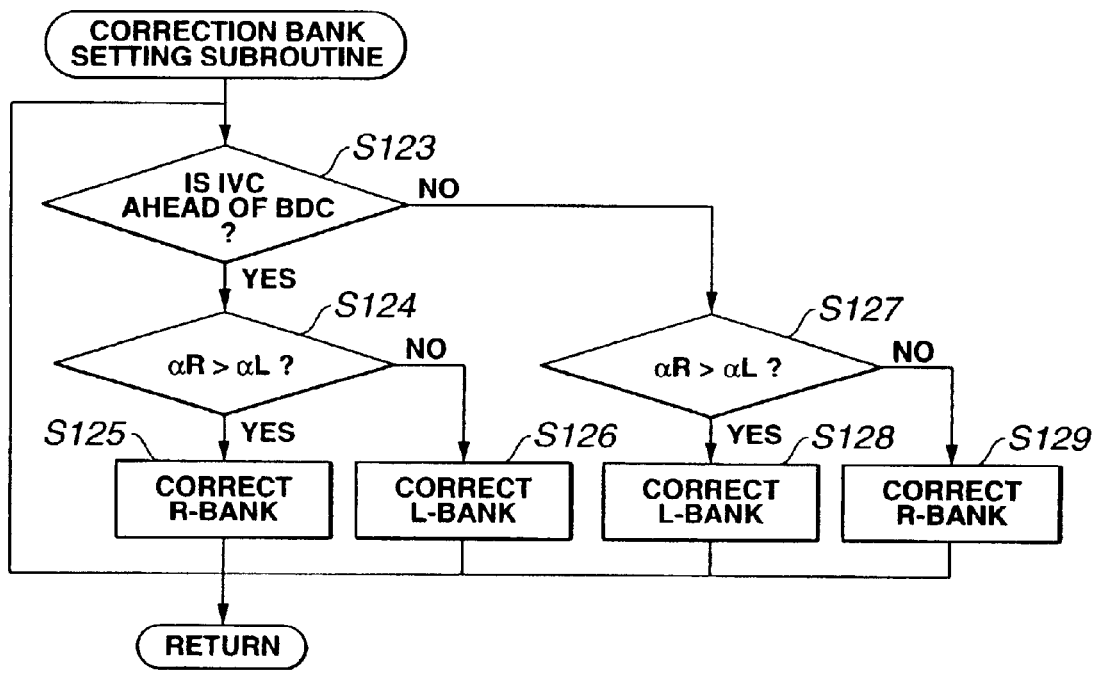
FIG. 9 is a flowchart showing a subroutine for determining a bank to be corrected in operation angle.

At step S103, ECU 50 determines a bank (cylinder train) to be corrected in the operation angle by executing a correction bank determining subroutine shown in FIG. 9.

At step S104, ECU 50 executes an operation angle correcting subroutine for correcting the operation angle of the selected bank (cylinder train). Then, the routine proceeds to the end block.

Figure 8:
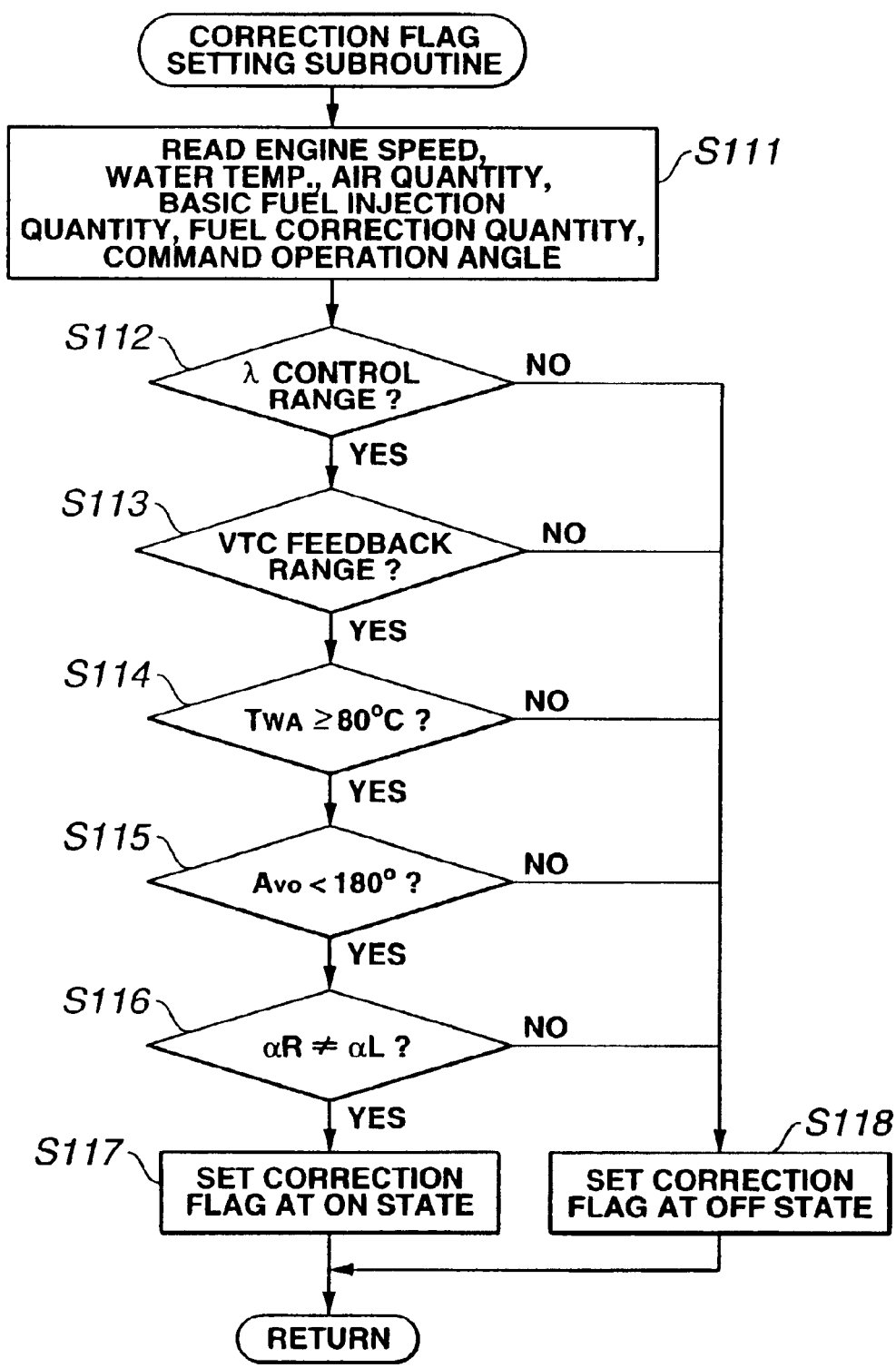
FIG. 8 is a flowchart showing a subroutine for setting a correction flag.

FIG. 8 shows the correction flag setting subroutine executed at step S101.

At step S111, ECU 50 reads the engine operating condition indicative parameters, such as an engine speed detected by a crank angle sensor 71, a temperature indicative of oil and water temperature detected by a temperature sensor, an intake air quantity measured by an airflow meter 63. Further, ECU 50 reads a parameters for the control, such as a basic fuel injection quantity set on the basis of the engine speed and the intake air quantity, and fuel correction quantities (feedback quantities) $\alpha R$ and $\alpha L$ for right and left banks RB and LB, and a request operation angle.

On the basis of the read parameters, ECU 50 determines whether the correction of the operation angle is executed or not by executing steps S112 through S116.

At step S112, ECU 50 determines whether the air-fuel ratio is in a feedback control range ($\lambda$ control range) or not. When the determination at step S112 is affirmative, the routine proceeds to step S113. When the determination at step S112 is negative, the routine jumps to step S118 wherein the correction flag is set at an off state indicative that the correction control of the operation angle for intake valves 1 is not executed.

At step S113, ECU 50 determines whether phase adjustment mechanism (VTC: Valve Timing Control) 20 is set in a feedback control range or not. More specifically, ECU 50 executes the feedback control of a phase of drive shaft 3 relative to a phase of crankshaft 5, on the basis of the outputs of crank angle sensor 71 and drive shaft angle sensor 72. Accordingly, when phase adjustment mechanism (VTC) 20 is put in the VTC feedback control range, that is, when the phase is accurately executed, the correction of the operation angle of each bank is accurately executed. On the other hand, when VTC feedback control is not executed, for example, when drive shaft 3 is fixed at a most retarded position by means of a fixing pin, a difference between A/F ratios of right and left banks RB and LB due to variations of phase adjustment mechanisms 20 tends to be generated by the initial variation among individuals of phase adjustment mechanisms 20 and by the accumulation of tolerances. Accordingly, when VTC feedback control is not executed, the correction of the operation angle is not preferable. Therefore, the routine proceeds to step S118 in rely to the negative determination at step S113.

At step S114, ECU 50 determines whether or not the water temperature Twa is greater or equal to 80° C., in order to execute the correcting operation under an engine stably operated condition. When the determination at step S114 is affirmative, the routine proceeds to step S115. When the determination at step S114 is negative, the routine proceeds to step S118.

At step S115, ECU 50 determines whether or not the valve opening duration $A_{vo}$ is smaller than 180° or not. That is, in this embodiment, the correcting operation is executed when valve opening duration $A_{vo}$ is set at a small operation angle corresponding to 180° (crank angle). This limitation of the valve operating duration is based on the reason that a proper and accurate correction is enabled when the correction of the operation angle is executed under a condition that the engine operates in a range where a change of the air quantity tends to be generated by the difference between the operation angles of right and left banks RB and LB. Further, when the valve opening timing of intake valves approximately corresponds to an intake stroke top dead center (TDC), when the valve closing timing of intake valves advances ahead of an intake stroke bottom dead center (BDC) and when the intake air quantity (weight) is relatively suppressed, the intake air quantity tends to be varied according to the change of the operation angle of the intake valves 1. Accordingly, under this condition satisfying such three states, the correction of the operation angle is executed. Therefore, when the determination at step S115 is affirmative, the routine proceeds to step S116. When the determination at step S115 is negative, the routine proceeds to step S118.

At step S116, ECU 50 determines whether or not a fuel correction quantity αR of right bank RB is different from a fuel correction quantity αL of left bank LB. That is, it may be assumed that the operation angle of right bank RB is approximately equal to the operation angle of left bank LB when the fuel correction quantity αR of right bank RB is approximately equal to the fuel correction quantity αL of left bank LB. When the determination at step S116 is affirmative, the routine proceeds to step S117. When the determination at step S116 is negative, the routine proceeds to S118.

At step S117, ECU 50 sets the correction flag at an on state indicative that the correction control of the operation angle for intake valves 1 is executed.

That is, only when all of the conditions of steps S112 through S116 are satisfied, the correction of the operation angle is executed. Further, when at least one of the conditions of steps S112 through S116 is not satisfied, the routine proceeds to step S118 wherein the correction flag is set at OFF state so as not to execute the correction of the operation angle.

After the execution of each step S117, S118, this subroutine is terminated, and the program returns to the main routine of FIG. 4.

Figure 7:
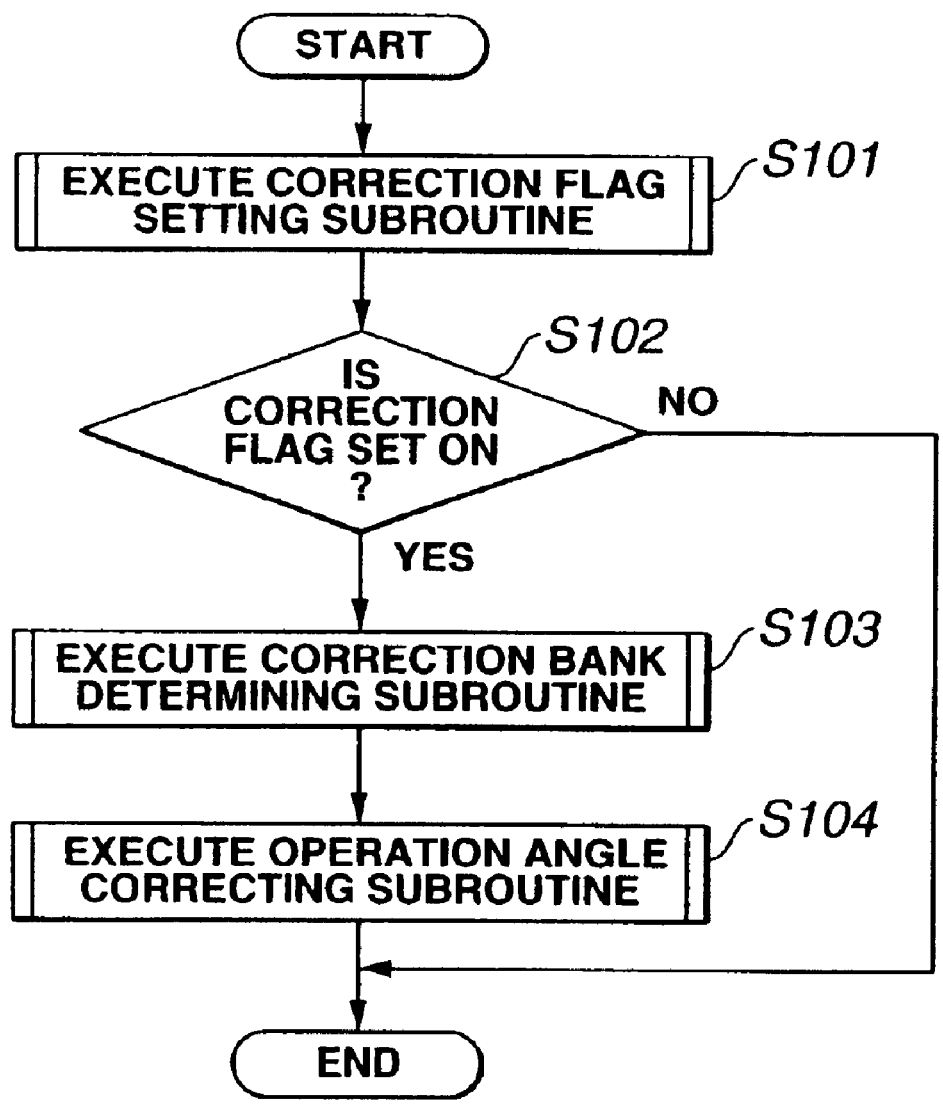
FIG. 7 is a flowchart showing a correction control employed in the first embodiment according to the present invention.

FIG. 9 shows the correction bank determining subroutine executed at step S103 in FIG. 7. This subroutine is executed in order to prevent the degradation of the engine operational stability and the interference between the intake valves and each piston which are caused by the increase of an overlap duration due to the excessive increase of the operation angle of intake valves 1.

At step S123 in the flowchart of FIG. 9, ECU 50 determines whether the intake valve closing timing (IVC) advances as compared with BDC or not. That is, it is determined whether the intake valve closing timing is advanced or retarded. When the determination at step S123 is affirmative, the routine proceeds to step S124. When the determination at step S123 is negative, the routine proceeds to step S127.

At step S124, ECU 50 determines whether fuel correction quantity αR of right bank RB is greater than fuel correction quantity αL of left bank LB. That is, when IVC advances as compared with BDC, the intake air quantity increases according to the increase of the operation angle of the intake valves. Therefore, at step S124, it is determined that the operation angle at one of right and left banks RB and LB is greater than that of the other of right and left banks RB and LB when the fuel correction quantity at the one of right and left banks RB and LB is greater than that of the other of right and left banks RB and LB. When the determination at step S124 is affirmative, the routine proceeds to step S125 wherein it is determined that the operation angle of right bank RB is corrected. When the determination at step S124 is negative, the routine proceeds to step S126 wherein it is determined that the operation angle of left bank LB is corrected.

On the other hand, at step S127, ECU 50 also determines whether fuel correction quantity αR of right bank RB is greater than fuel correction quantity αL of left bank LB. That is, when IVC retards as compared with BDC, the retard angle quantity relative to BDC increases according to the increase of the operation angle. Therefore, the intake air quantity decreases according to the increase of the operation angle of the intake valves. Therefore, at step S127, it is determined that the operation angle at one of right and left banks RB and LB is greater than that of the other of right and left banks RB and LB when the fuel correction quantity at the one of right and left banks RB and LB is smaller than that of the other of right and left banks RB and LB. When the determination at step S127 is affirmative, the routine proceeds to step S128 wherein it is determined that the operation angle of left bank LB is corrected. When the determination at step S127 is negative, the routine proceeds to step S129 wherein it is determined that the operation angle of right bank RB is corrected.

After the execution of each step S125, S126, S128, S129, this subroutine is terminated, and the program returns to the main routine of FIG. 4.

Figure 10:
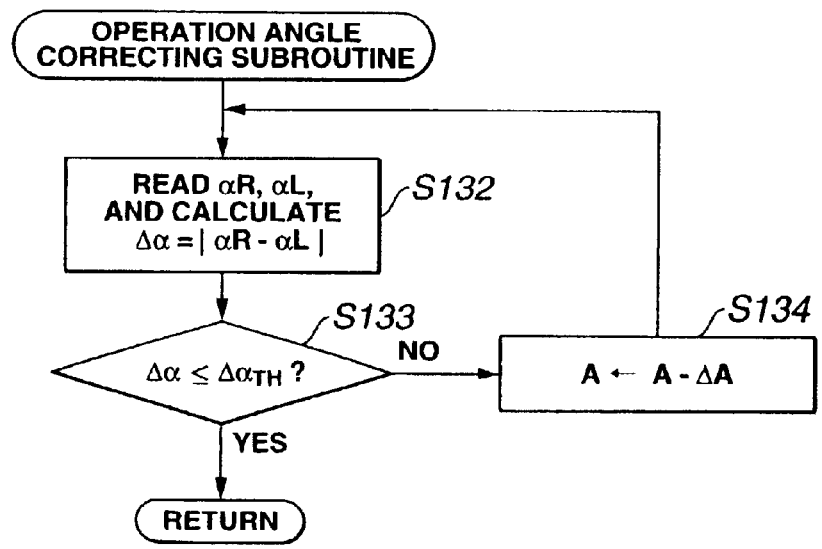
FIG. 10 is a flowchart showing a subroutine for correcting an operation angle of intake valves of the selected bank.

FIG. 10 shows the operation angle correcting subroutine executed at step S104 of FIG. 7.

At step S132, ECU 50 reads fuel correction quantities αR and αL of right and left banks RB and LB and calculates a difference Δα between fuel correction quantities αR and αL (Δα=|αR−αL|).

At step S133, ECU 50 determines whether or not difference Δα is smaller than or equal to a threshold $\Delta\alpha_{TH}$. When the determination at step S133 is affirmative, ECU 50 determines that fuel correction quantity αR of right bank RB is approximately equal to fuel correction quantity αL of left bank LB. Accordingly, this subroutine is terminated, and the program returns to the main routine of FIG. 7. When the determination at step S133 is negative, ECU 50 determines that fuel correction quantity αR of right bank RB is different from fuel correction quantity αL of left bank LB. Accordingly, the routine proceeds to step S134 wherein ECU 50 decreases the operation angle A of the bank, whose fuel correction quantity is greater than that of the other bank, by a predetermined angle ΔA (A←A−ΔA). More specifically, the angle of control shaft 13 of the selected one of right and left banks RB and LB is shifted by angle ΔA toward the smaller operation angle side. Then, the routine returns to step S132. That is, until the affirmative determination is made at step S133, steps S132, S133 and S134 are repeated. In order to improve the correction accuracy, a predetermined time period needed for converging the fuel correction quantity by the execution of the air-fuel ratio feedback control is counted during a transition from step S134 to step S132.

By updating the angular position of control shaft 13 by the above-discussed manner, the angular position of the other control shaft 13 is controlled with reference to the corrected operation angle of the other bank. Further, by storing an accumulated value of the angle ΔA and by correcting an initial phase of control shaft 13 on the basis of the accumulated value, it becomes possible to utilize this stored content in the control to be executed.

With this arrangement according to the present invention, it becomes possible to correct the operation angle adjusted by operation angle adjustment mechanism 10 by means of a simple structure employing the exhaust parameter of air-fuel ratio sensor 56. Further, it becomes possible to correct the operation angles A of right and left banks RB and LB so as to be approximately equal with each other. As a result, the variation between the torques of right and left banks RB and LB is suppressed and the operational stability of the engine is improved. Furthermore, since the correction of the operation angle is executed during the fuel feedback control, the exhaust performance during the correcting operation is maintained. That is, it becomes possible to execute the correcting operation without degrading the drivability.

Figure 11:
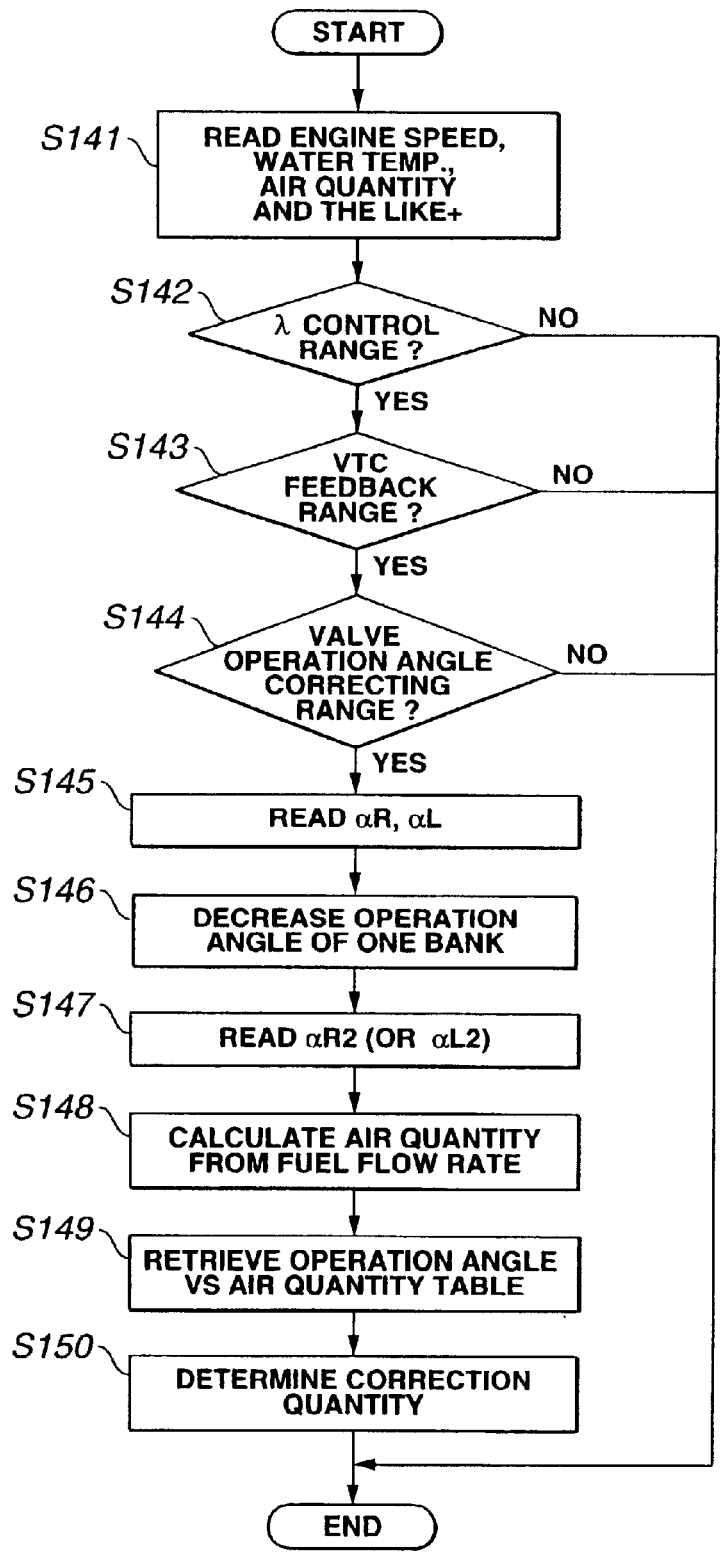
FIG. 11 is a flowchart showing a correction control employed in a second embodiment according to the present invention.
Figure 12:
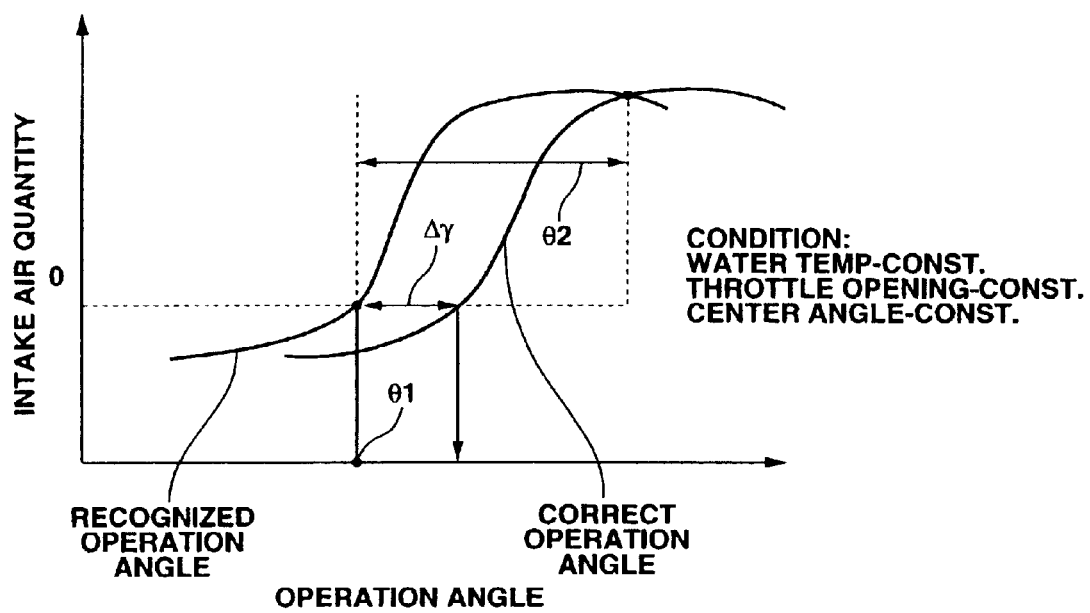
FIG. 12 is a graph showing a relationship between the operation angle and the intake air quantity employed in the second embodiment.

Referring to FIGS. 11 and 12, there is shown a second embodiment of the control system according to the present invention. A flowchart of FIG. 11 shows an operation angle correcting operation characteristically employed in the second embodiment. That is, the operation angle of intake valves 1 is positively varied in each cylinder train (each bank) to correct the operation angle. This control is preferably adapted in a case that the correction of the operation angle is executed under an engine operation range where the change of intake air quantity is dully relative to the change of IVO (intake valve opening timing) and IVC (intake valve closing timing). The basis construction of the control system of the second embodiment is the same as that of the first embodiment shown in FIGS. 1 through 4. Therefore, the explanation as same as that in the first embodiment is omitted herein. Further, in this second embodiment, O$_2$ sensor is employed as air-fuel ratio sensor 56.

At step S141 of FIG. 11, ECU 50 reads engine speed, water temperature, air weight, target operation angle, fuel correction quantities of right and left banks RB and LB as parameters.

At step S142, ECU 50 determines whether the air-fuel ratio is in the feedback control range (λ control range) or not. When the determination at step S142 is affirmative, the routine proceeds to step S143. When the determination at step S142 is negative, the routine jumps to an end block to terminate the present routine.

At step S143, ECU 50 determines whether phase adjustment mechanism (VTC: valve timing control) 20 is set in a feedback control range or not. When the determination at step S143 is affirmative, the routine proceeds to step S144. When the determination at step S143 is negative, the routine jumps to the end block. That is, only when both of steps 142 and 143 make the affirmative determination, the correction of the operation angle is executed.

At step S144 subsequent to the affirmative determination at step S143, ECU 50 determines whether IVC (intake valve closing timing) approximately corresponds BDC or not, and whether the operation angle approximately corresponds to 180° CA (crank angle) or not. The reason for executing these determinations will be discussed hereinafter with reference to FIG. 12.

As is clear from FIG. 12, the change of the intake air quantity relative to the change of the operation angle gradually becomes slow as the operation angle increases. Further, under a low engine speed condition, inertia effect to the valve timing is very small, and therefore IVC is set at a constant timing near BDC (bottom dead center), and the change of the intake air quantity is very small even if IVC slightly offsets from BDC. Therefore, in this second embodiment, the correction of the operation angle is executed when IVC is approximately equal to BDC. Further, in order to decrease the remaining gas quantity as possible so as not to affect the volumetric efficiency, the correction of the operation angle is preferably executed at timing when the intake valve opening timing IVO is set at a timing in the vicinity of TDC (top dead center). The operation-angle correcting range, wherein these two conditions are satisfied, is corresponded to a range where IVC is approximately equal to BDC and the operation angle is approximately 180° CA.

At step S145, ECU 50 reads fuel correction quantities αR and αL.

At step S146, ECU 50 decreases the operation angle of one of right and left banks RB and LB so that the change of the intake air quantity is preferably performed. For example, as shown in FIG. 12, the operation angle of one of right and left banks RB and LB is decreased to a predetermined small operation angle θ1 or decreased by a predetermined angle θ2. Then, the decreased operation angle is maintained until the fuel correction quantity of the angle decreased bank side is converged by the air-fuel ratio feedback control.

At step S147, ECU 50 measures and reads fuel correction quantity αR2 or αL2 at the operation-angle decreased bank.

At step S148 subsequent to step S147, ECU 50 calculates the intake air quantity based on the airflow rate. At step S149, ECU 50 retrieves a table indicative of a relationship between the operation angle and the intake air quantity, which table is previously stored in a storage section of ECU 50. This table may be, for example, a table indicative of the relationship shown in FIG. 12. Furthermore, it may be the mapped data indicative of the relationship between the operation angle and the intake air quantity when the correction of the operation angle is executed in an expanded engine operation range.

At step S150, ECU 50 determines a correction quantity Δγ of the operation angle with reference to data of the table retrieved in step S149. On the basis of the obtained correction quantity Δγ, the correction of the operation angle is executed. This routine shown by FIG. 11 is executed by each bank LB, RB so that the operation angles of both banks are similarly executed. That is, in case that the internal combustion engine has two cylinder trains, the flowchart of FIG. 11 is executed twice.

In this second embodiment, by decreasing the operation angle to the predetermined small operation angle θ1 or decreasing the operation angle by the predetermined angle θ2, the correction quantity of the operation angle is calculated. Therefore, it becomes possible to execute the calculation of the correction quantity under a small operation angle state in that the intake air quantity is largely changed according to the change of the operation angle, thereby improving the correction accuracy. Further, by executing this correcting operation by each bank, the variation between the operation angles of banks LB and RB is suppressed as is similar to that ensured in the first embodiment.

Figure 13:
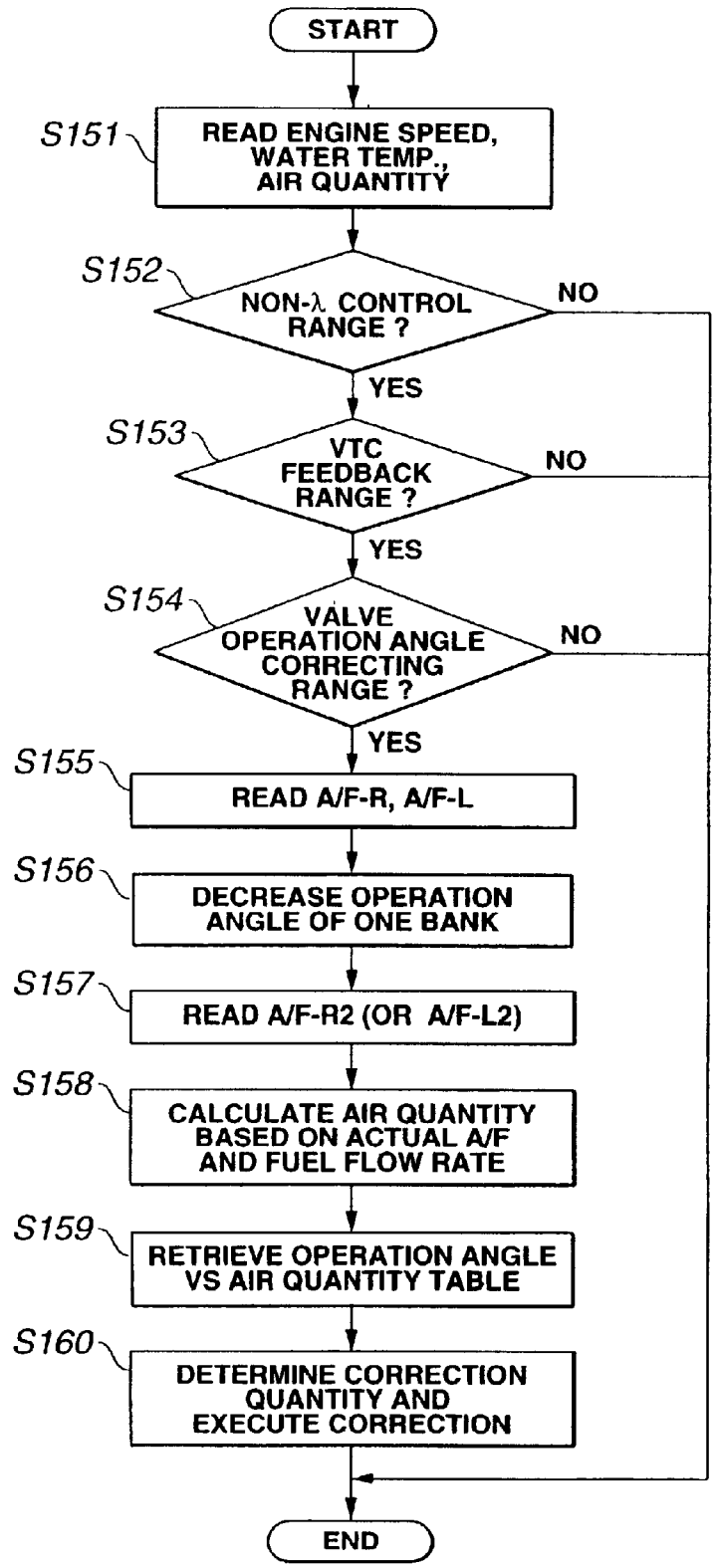
FIG. 13 is a flowchart showing a correction control employed in a third embodiment according to the present invention.
Figure 14:
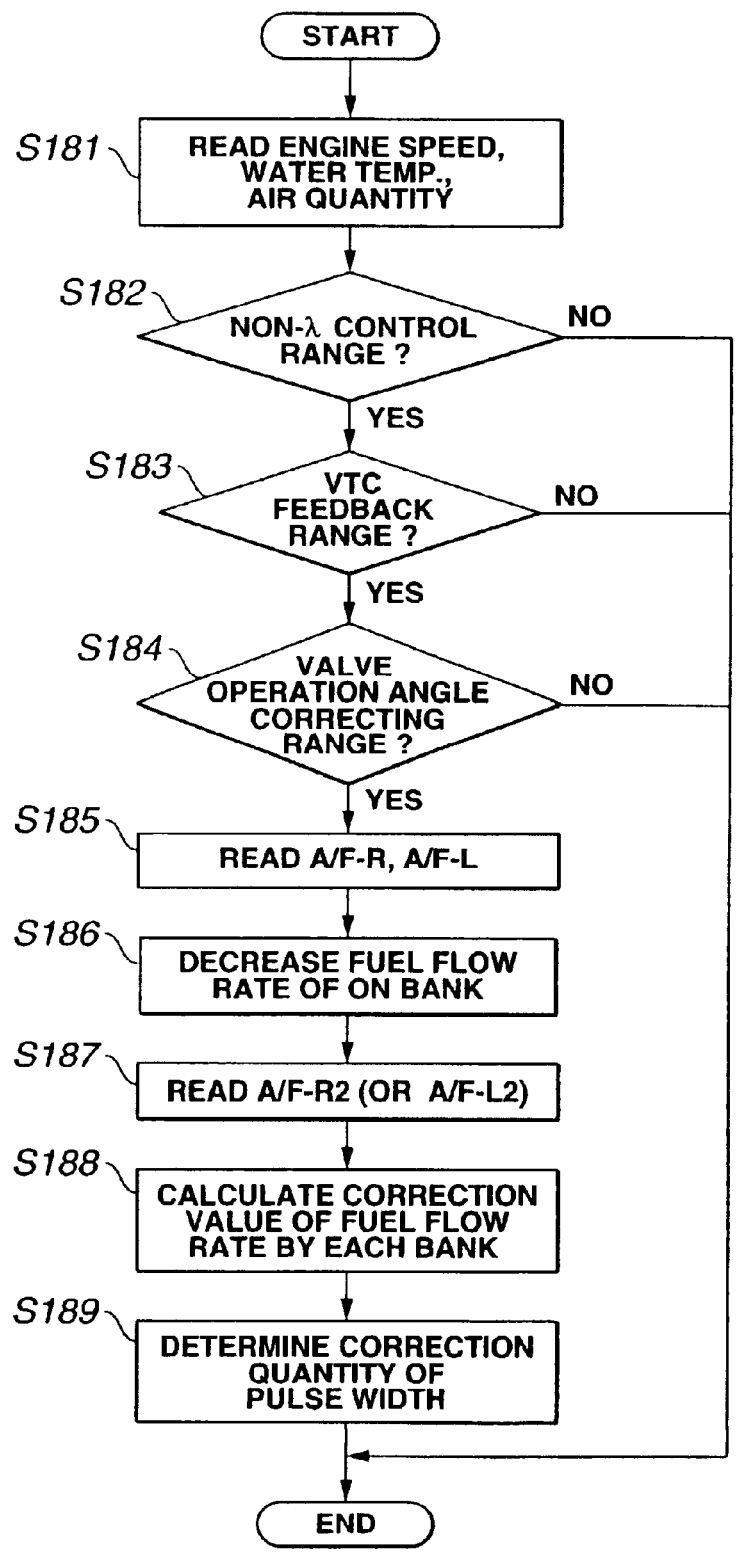
FIG. 14 is a flowchart showing a fuel flow-ate correction control according to the present invention.
Figure 15:
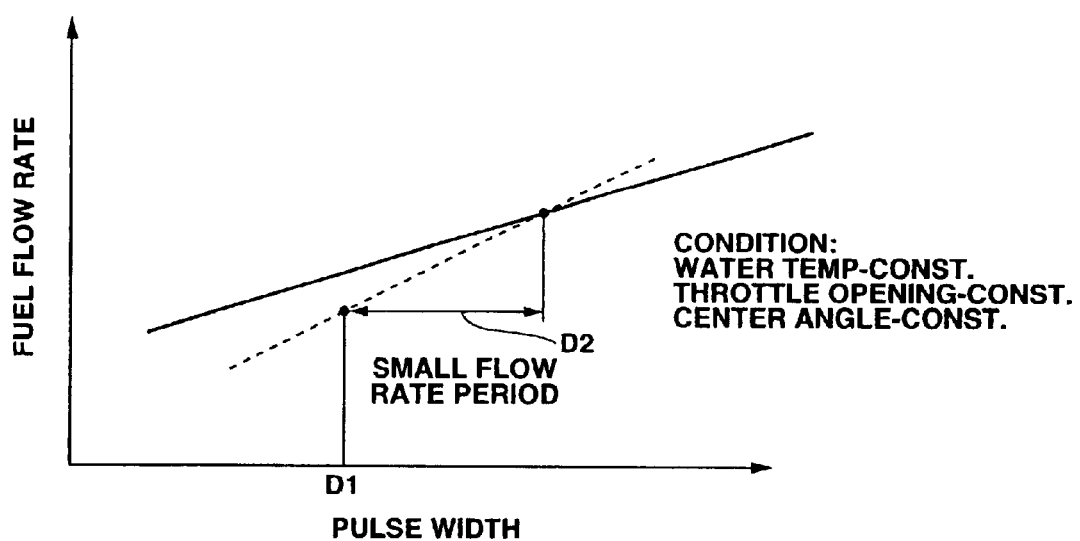
FIG. 15 is a graph showing a relationship between a pulse-width of a fuel injector and a fuel injection quantity.

Referring to FIGS. 13 through 15, there is shown a third embodiment of the control system according to the present invention. A flowchart of FIG. 13 shows an operation angle correcting operation characteristically employed in the third embodiment.

In this third embodiment, a linear type air-fuel ratio sensor is employed as air-fuel ratio sensor 56 for each bank instead of $O_2$ sensor. Linear type air-fuel ratio sensor is capable of detecting an actual air-fuel ratio corresponding an actual air-fuel ratio in exhaust gas. Further, the correction of the operation angle is executed in non-λ control range, and the actual air-fuel ratio of the exhaust gas measured by linear type air-fuel sensor 56 is directly employed as a parameter for the correction instead of the fuel correction quantity α. The basis construction of the control system of the third embodiment is the same as that of the first embodiment shown in FIGS. 1 through 4. Therefore, the explanation as same as that in the first embodiment is omitted herein.

The explanation as same as that of the first embodiment is omitted herein.

That is, at step S151 in FIG. 13, ECU 50 reads parameters representative of the engine operating condition and the control parameter, as is similar to each step S111, S141.

At step S152, ECU 50 determines whether or not the air-fuel ratio is in non-λ control range (a non-feedback control range). When the determination at step S152 is affirmative, the routine proceeds to step S153. When the determination at step S152 is negative, the routine jumps to an end block to terminate the present routine.

At step S153, ECU 50 determines whether phase adjustment mechanism (VTC) 20 is set in the feedback control range or not, as is similar to the execution at step S143. When the determination at step S153 is affirmative, the routine proceeds to step S154. When the determination at step S153 is negative, the routine jumps to the end block.

At step S154, ECU 50 determines whether IVC approximately corresponds BDC or not, and whether the operation angle approximately corresponds 180° CA or not, as is similar to the execution at step S144. When the determination at step S154 is affirmative, the routine proceeds to step S155. When the determination at step S154 is negative, the routine jumps to the end block.

At step S155, ECU 50 reads actual air-fuel ratios A/F-R and A/F-L of right and left banks RB and LB.

At step S156, ECU 50 decreases the operation angle of one of right and left banks RB and LB.

At step S157, ECU 50 reads actual air-fuel ratio A/F-R2 or A/F-L2 of the angle-decreased bank.

At step S158, ECU 50 calculates the intake air quantity on the basis of actual air-fuel ratio A/F-R2 or A/F-L2 obtained at step S157 and the fuel flow rate.

At step S159, ECU 50 retrieves a table indicative of a relationship between the operation angle and the intake air quantity, which table is previously stored in a storage section of ECU 50. This table may be the mapped data indicative of the relationship between the operation angle and the intake air quantity.

At step S160, ECU 50 determines a correction quantity Δγ of the operation angle on the basis of the intake air quantity calculated at step S158 and the data of the table retrieved in step S159. On the basis of the obtained correction quantity Δγ, the correction of the operation angle is executed.

In this third embodiment, the correction enabling range is decreased since the correcting operation is executed during the non λ control. However, it is not necessary to await for the time period needed for converting the fuel correction quantity. Therefore, it is possible to shorten a period for executing the correcting operation.

Further, in this third embodiment, the correction of the operation angle is executed when the engine operates in non-λ control range wherein the drivability of the vehicle is almost not affected by the correcting operation. Accordingly, the degradation of the drivability during the correcting operation is effectively suppressed by positively decreasing the operation angle. That is, the actual non-λ control is executed during an engine starting period, warming period, a high load operating condition after the warming period and a decelerating period, except for a steady state traveling after the warming operation and a slow acceleration state. Accordingly, the correcting operation in the non-λ control range does not generate an actual problem. Particularly, by executing the correction of the operation angle just after the engine start and by reflecting the correction content in the operation of the engine thereafter, the energy consumption and the combustion stability are improved just after the engine start.

In order to further improve the accuracy of the above-discussed correction control of the operation angle, it is preferable that the fuel flow rate is previously corrected. FIG. 14 shows a flowchart of a correction control as to the fuel flow rate. The flowchart of FIG. 14 is basically the same as that of FIG. 13, except that the controlled object is not the operation angle, but the fuel flow rate (pulse width for fuel injector 73). Therefore, the explanation of steps S181 through S185, and step S187 is omitted herein since they are as same as step S151 through S155, and step S157 in FIG. 13.

At step S186 in FIG. 14 subsequent to the execution of step S185, ECU 50 decreases the fuel flow rate at one of right and left banks RB and LB (decreases the pulse width of fuel injectors 73 at one of right and left banks RB and LB) so that the change of the pulse width effectively affects the change of the fuel flow rate. For example, the pulse width for fuel injectors 73 is decreased by a predetermined quantity D2 or is set at a predetermined value D1 as shown in FIG. 15.

At step S188 subsequent to the execution of step S187, ECU 50 calculates the fuel flow rate correction value for the fuel injectors 73 of each bank.

At step S189, ECU 50 determines a correction quantity of the pulse width on the basis of the calculated fuel flow rate correction value. Further, ECU 50 actually corrects the pulse width for the fuel injector 73 of the selected one of right and left banks RB and LB. The pulse width for the fuel injectors 73 of the other bank is corrected in the same manner as described above.

By executing this correction control of the fuel pulse width simultaneously with or prior to the correction control of the operation angle, it becomes possible to correcting the operation angle under a condition that the fuel flow rates of both banks are equalized. This further improves the control accuracy.

As a reason of differentiating the operation performances between right and left banks RB and LB, there is a difference between the fuel flow rates to right and left banks RB and LB or a different between the operation angles of right and left banks RB and LB. Therefore, by independently executing the correction of the pulse width for each bank and the correction of the operation angle for each bank, it becomes possible to further accurately correct the variation between the fuel flow rates of the respective banks and the variation between the operation angles of the respective banks.

Figure 16:
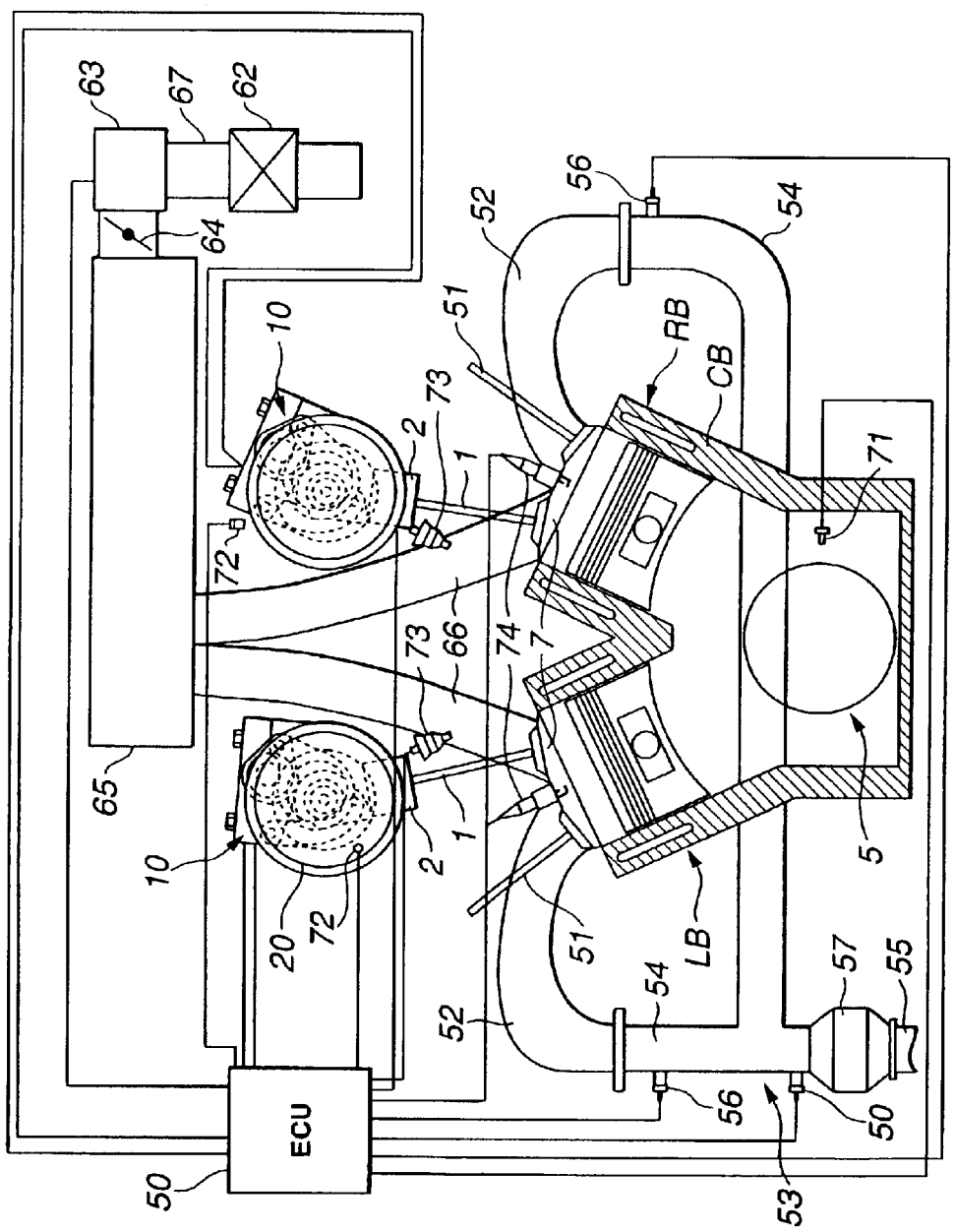
FIG. 16 is a schematic view showing the control system of the internal combustion engine of a fourth embodiment according to the present invention.

Referring to FIGS. 16 through 19, there is shown a fourth embodiment of the control system for the internal combustion engine in accordance with the present invention. The construction of the fourth embodiment shown in FIG. 16 is basically similar to that of the first embodiment shown in FIGS. 1 through 4 except that an aggregation air-fuel ratio sensor 58 is disposed at exhaust-gas collecting portion 55 at which branched exhaust gas passages 54 for right and left banks RB and LB are merged, in addition to air-fuel ratio sensors 56 for right and left banks RB and LB. These air-fuel ratio sensors 56 and 58 are of a linear type which is capable of detecting an actual air fuel ratio. Each air-fuel ratio sensor 56 at each branch exhaust gas passage 54 detects an actual air-fuel ratio (A/F-R, A/F-L) of each bank (each cylinder train). Aggregation air-fuel ratio sensor 58 detects an actual air-fuel ratio (aggregation A/F) at exhaust-gas collecting portion 55.

The other constructions of the fourth embodiment shown in FIG. 16 is basically the same as that of the first embodiment shown in FIGS. 1 through 4. Therefore, such same parts and elements are denoted by same reference numerals, and the explanation of thereof is omitted herein.

A main routine for the correction control of the operation angle employed in the fourth embodiment will be discussed with reference to FIG. 17.

At step S261, ECU 50 executes a correction flag setting subroutine wherein ECU 50 determines the correction flag indicative whether a correction of the operation angle (a valve opening mechanism) for intake valves 1 is executed or not. That is, the programs jumps to the correction flag setting subroutine shown in FIG. 18.

At step S262, ECU 50 determines whether the correction flag is set at on-state or not. When the determination at step S262 is affirmative, the routine proceeds to step S263. When the determination at step S262 is negative, the routine proceeds to an end block.

Figure 19:
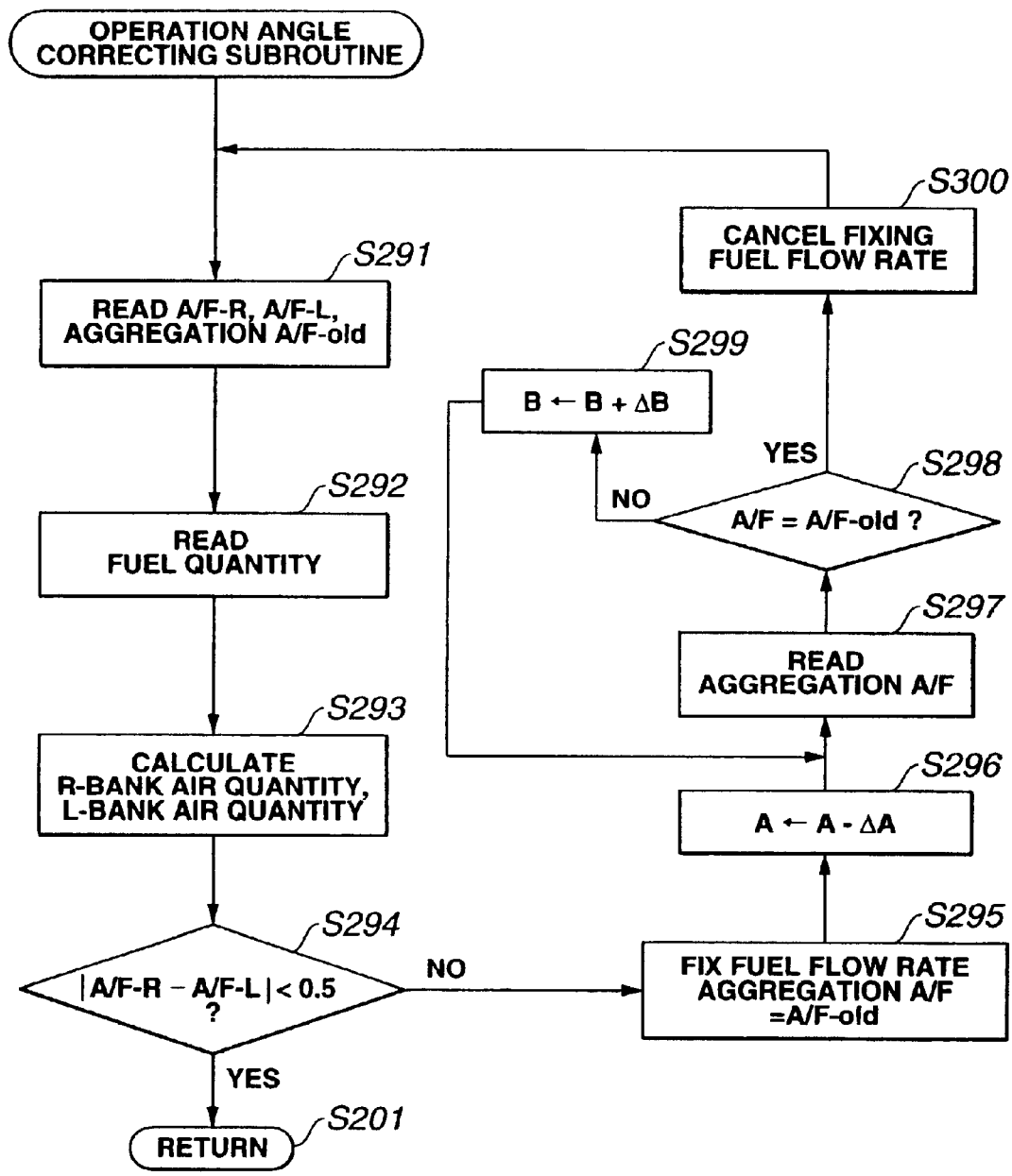
FIG. 19 is a flowchart showing a subroutine for correcting the operation angle employed in the fourth embodiment.

At step S263, ECU 50 determines a bank (cylinder train) to be corrected in the operation angle by executing a correction bank determining subroutine shown in FIG. 19. Then, the routine proceeds to the end block.

Figure 18:
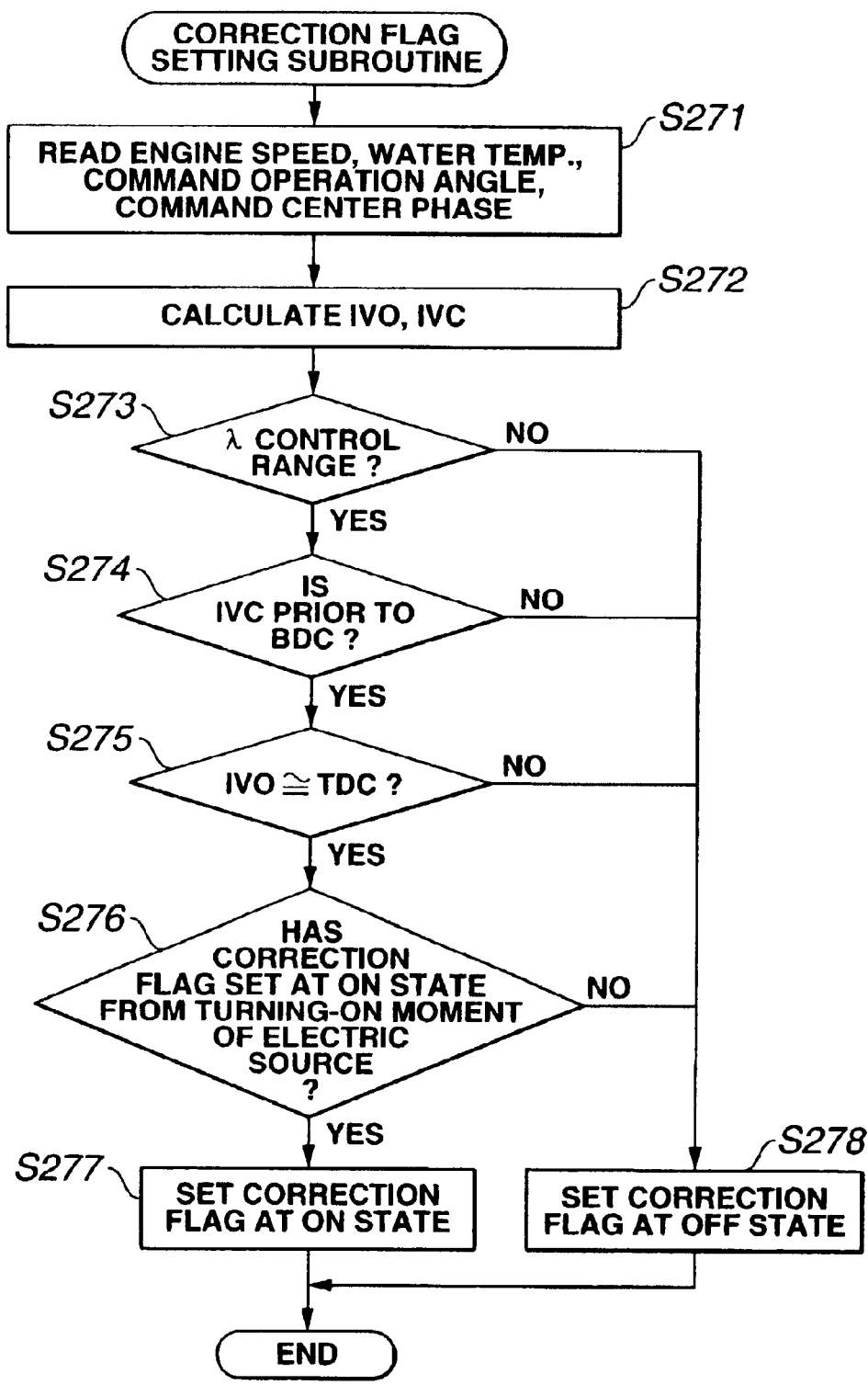
FIG. 18 is a flowchart showing a subroutine for setting the correction flag employed in the fourth embodiment.

FIG. 18 shows the correction flag setting subroutine executed at step S261.

At step S271, ECU 50 reads parameters such as the engine speed, the temperature indicative of oil and water temperature, the command operation angle and the command center phase.

At step S272, ECU 50 calculates IVO and IVC.

At step S273, ECU 50 determines whether the air-fuel ratio is in the feedback control range (λ control range) or not. When the determination at step S273 is affirmative, the routine proceeds to step S274. When the determination at step S273 is negative, the routine jumps to step S278 wherein the correction flag is set at off state.

At step S274, ECU 50 determines whether IVC advances as compared with BDC or not. When the determination at step S274 is affirmative, the routine proceeds to step S275. When the determination at step S274 is negative, the routine jumps to step S278.

At step S275, ECU 50 determines whether IVO is approximately equal to top dead center (TDC) or not (IVO≅TDC?). When the determination at step S275 is affirmative, the routine proceeds to step S276. When the determination at step S275 is negative, the routine jumps to step S278. That is, ECU 50 determines the intake valve opening and closing timings (IVO and IVC) for the intake valves 1 to be corrected in the operation angle. By the determinations at steps S274 and S275, a correction execution range is determined within an engine operation range where a difference between the operation angles of right and left banks RB and LB largely affects the difference between the intake air quantities of right and left banks RB and LB.

At step S276, ECU 50 determines whether or not the correction flag has been turned on from a time when the electric power source was turned on. This determination is made so as not to repeatedly execute the correction several times from the turning on of the electric source since the operation angle correction control is executed to eliminate the difference between the cylinder trains (banks). When the determination at step S276 is affirmative, the routine proceeds to step S277. When the determination at step S276 is negative, the routine jumps to step S278.

However, when the correcting operation of this fourth embodiment is positively executed in the range where the operation angles or the center phases of the intake valves 1 of the respective banks RB and LB such as during a transient state, the correcting control of the operation angle may be executed several times, and the determination as to the state of the correction flag may be made during a converging state.

That is, only when all of the conditions of steps S273 through S276 are satisfied, the routine proceeds to step S277 wherein ECU 50 sets the correction flag at ON state. When at least one of all of the conditions at steps S273 through S276 is not satisfied, the routine proceeds to step S278 wherein ECU 50 sets the correction flag at OFF state.

Figure 17:
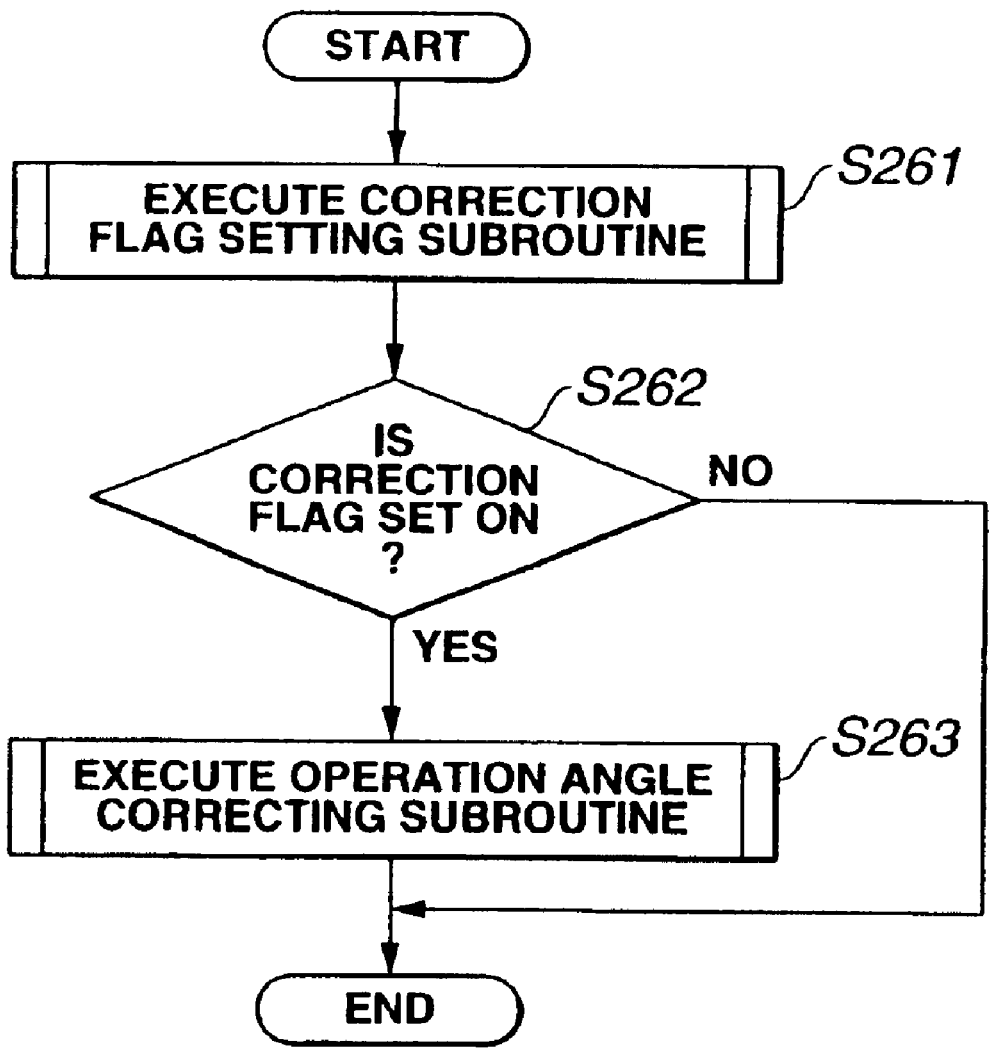
FIG. 17 is a flowchart showing the main control employed in the fourth embodiment.

FIG. 19 shows the operation angle correcting subroutine executed at step S263 in FIG. 17.

At step S291, ECU 50 reads actual cylinder-train air-fuel ratios (A/F-R and A/F-L) detected by cylinder-train air-fuel ratio sensors 56 and actual aggregation air-fuel ratio (aggregation A/F-old) detected by aggregation air-fuel ratio sensor 58.

At step S292, ECU 50 reads the fuel quantity.

At step S293, ECU 50 calculates the intake air quantities of right and left banks on the basis of the actual cylinder-train air-fuel ratio and the actual fuel quantity of each cylinder train (each bank) obtained at steps S291 and 292.

At step S294, ECU 50 determines whether or not an absolute value of a difference (|A/F-R−A/F-L|) between the actual cylinder-train air-fuel ratios is smaller than 0.5. When the determination at step S294 is affirmative (|A/F-R−A/F-L|<0.5), the present routine proceeds to a return step for returning to the main routine of FIG. 17. When the determination at step S294 is negative, the routine proceeds to step S295.

At step S295 subsequent to the negative determination at step S294, ECU 50 fixes the fuel flow rate. That is, ECU 50 temporally stops the air-fuel ratio feedback control and executes an open control using the aggregation air-fuel ratio (A/F-old).

At step S296, ECU 50 determines a lean side cylinder train whose operation angle is relatively greater than the operation angle of the other cylinder train on the basis of actual cylinder-train air-fuel ratios, and decreases the operation angle of the lean side cylinder train by a predetermined small quantity. More specifically, control shaft 13 is rotated toward a small angle side by a predetermined small angle ΔA (A←A−ΔA). Since the operation range for the correcting operation executed at step S274 in FIG. 18 is limited within a condition that IVC advances as compared with BDC, the operation angle of the lean side cylinder train is greater than that of the rich side cylinder train.

At step S297, ECU 50 reads a present value of aggregation A/F detected by aggregation air-fuel sensor 58.

At step S298, ECU determines whether or not the present value of aggregation air-fuel ratio A/F obtained at step S297 is equal to aggregation air-fuel ratio A/F-old read at step S291. When the determination at step S298 is affirmative (A/F=A/F-old), the routine proceeds to step S300. When the determination at step S298 is negative, the routine proceeds to step S299.

At step S299, ECU 50 increases the operation angle of the rich side cylinder train (small angle side) by a predetermined small quantity. More specifically, control shaft 13 of the rich side cylinder train is rotated toward a large angle side by a predetermined small angle $\Delta B$ ($B \leftarrow B + \Delta B$). After the execution of the step S299, the routine returns to step S297.

That is, until the affirmative determination is made at step S298 (A/F=A/F-old) that is, until the aggregation air-fuel ratio before the correcting operation at step S299 (S296) becomes equal to aggregation air-fuel ratio after the correcting operation at step S299 (S296), step S299 is repeated to increase stepwise the operation angle at the small angle side cylinder train. When the aggregation air-fuel ratios before and after the angle correction are approximately equalized, that is, when the affirmative determination is made at step S298, the routine proceeds to step S300.

At step S300, ECU 50 cancels the fixing of the fuel flow rate. Then, the routine returns to step S291.

That is, the processing between steps S291 through S300 is repeatedly executed until the affirmative determination is made at step S294 where ECU 50 determines whether the actual cylinder-train air-fuel ratio of right bank RB is approximately equal to the actual cylinder-train air-fuel ratio of left bank LB.

When the affirmative determination is made at step S294, the program returns to the main routine of FIG. 17, and the main routine is then terminated.

The reason for setting the tolerance of step S294 at 0.5 is that this difference corresponds to about 4% difference of the air quantity under an engine operating condition near the stoichiometric ratio, and that when the engine having four or more cylinders operates within the ordinary operation range, the degradation of the operational stability of the engine is allowed.

In this fourth embodiment, the operation angle at the lean side cylinder train (larger operation-angle side) is decreased at step S296, and the operation angle at the rich side cylinder train (smaller operation-angle side) is then increased at step S299. This arrangement of the fourth embodiment prevents the operation angle from excessively increasing during the correcting operation. Further, this certainly prevents the interference between the piston and the valve and the unnecessary increase of the valve overlap.

Further, the control in this fourth embodiment is arranged such that the air quantity is increased at steps S298 and S299 after the air quantity is decreased at step S296. Accordingly, the variation of the total air quantity of the engine is suppressed and the torque variation during the correcting operation is also suppressed. Further, it becomes possible to properly execute the correcting operation without generating hunting even when the operation angle is set small where the air quantity largely changes relative to the change of the operation angle.

Additionally, the control in this embodiment is arranged to execute the correction of the operation angle upon temporally stopping the air-fuel ratio feedback control. This arrangement enables the correction quantity regarding the $\lambda$ control and the correction quantity regarding the operation angle to be easily separated, and therefore it becomes possible to ensure both of the improvement of the energy consumption and the engine operation stability.

Figure 20:
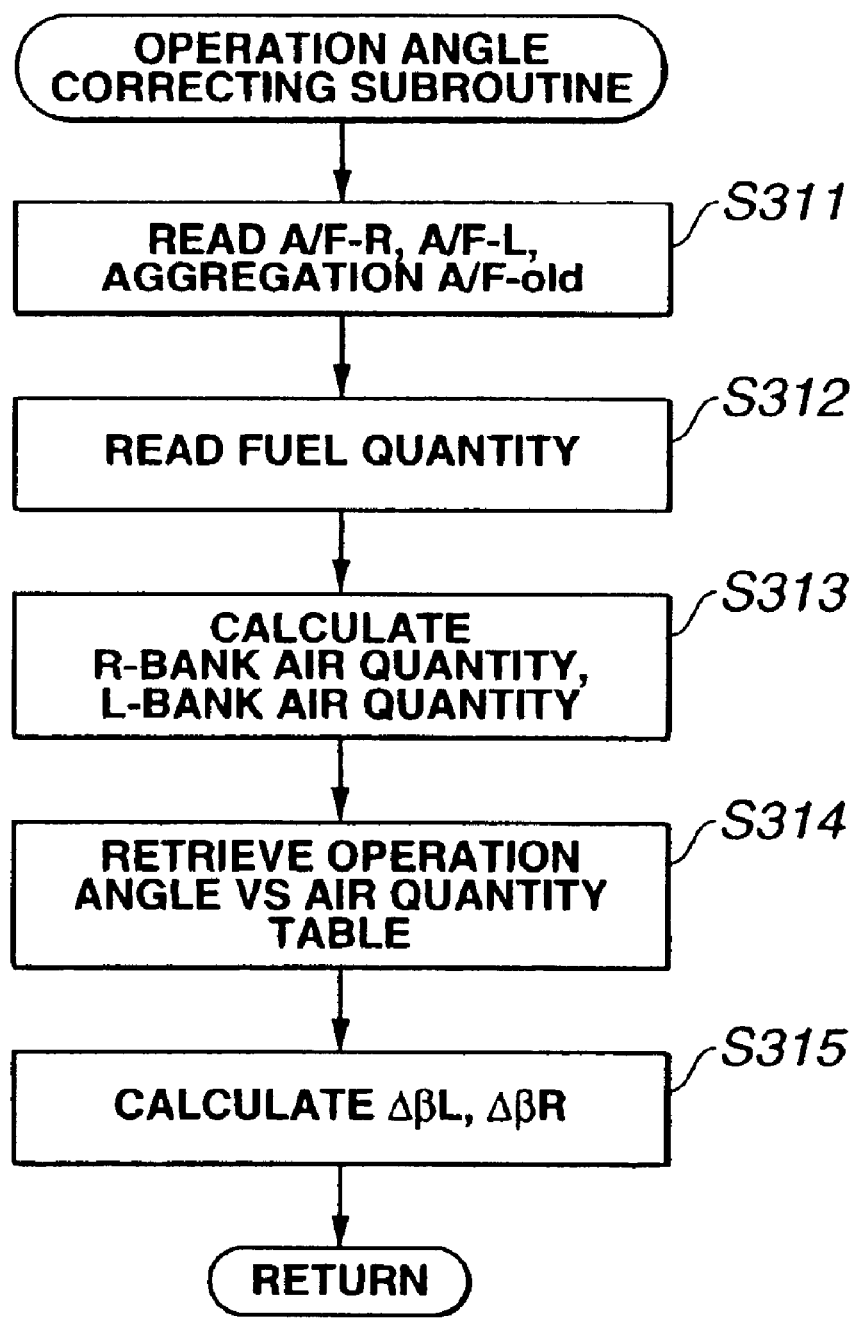
FIG. 20 is a flowchart showing a subroutine for correcting the operation angle employed in the fifth embodiment.

Referring to FIG. 20, there is shown a fifth embodiment of the control system according to the present invention. The hardware construction of the fifth embodiment is the same as that of the fourth embodiment shown in FIG. 16. Further, the main routine of the fifth embodiment is also the same as the fourth embodiment shown in FIG. 17. The fifth embodiment is characteristically arranged in a subroutine for correcting the operation angle executed at step S263 in FIG. 17, as shown in FIG. 20.

At step S311, ECU 50 reads actual cylinder-train air-fuel ratios (A/F-R and A/F-L) detected by cylinder-train air-fuel ratio sensors 56 and actual aggregation air-fuel ratio (aggregation A/F-old) detected by aggregation air-fuel ratio sensor 58.

At step S312, ECU 50 reads the fuel quantity.

At step S313, ECU 50 calculates the intake air quantities of right and left banks on the basis of the actual cylinder-train air-fuel ratio and the actual fuel quantity of each cylinder train (each bank) obtained at steps S311 and S312.

Figure 21:
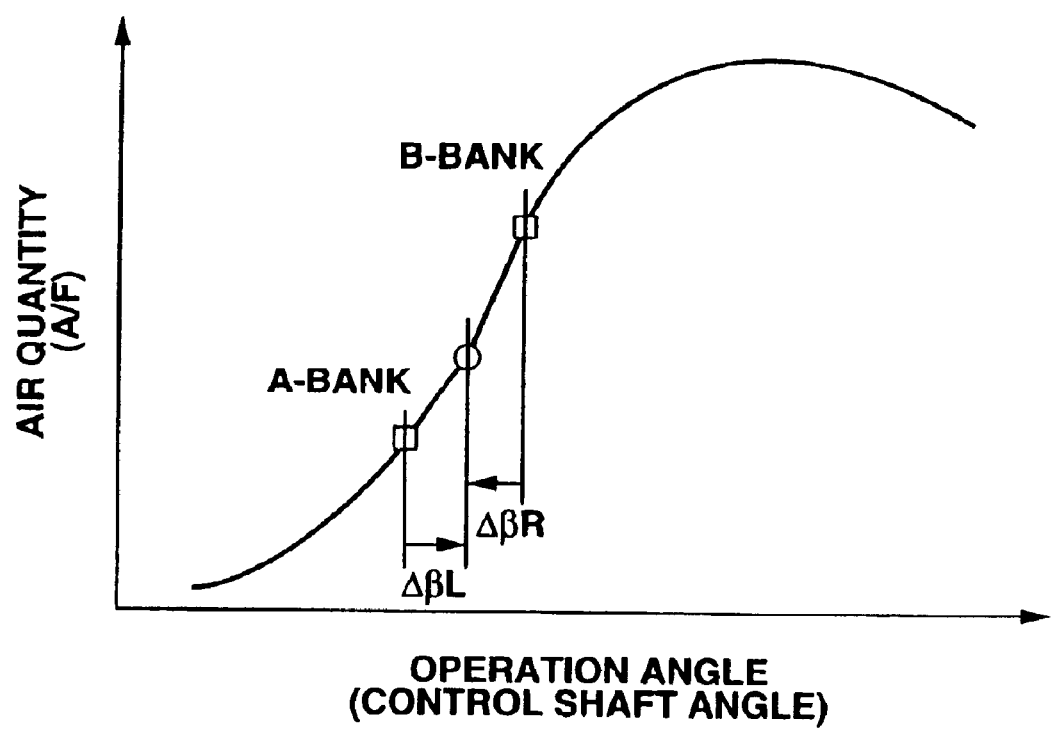
FIG. 21 is a graph showing a relationship between the operation angle and the intake air quantity employed in the fifth embodiment.

At step S314, ECU 50 retrieves a table showing a relationship between the operation angle and the air quantity, such as a table shown in FIG. 21. The table shown in FIG. 21 has been previously stored in the storage section of ECU 50 and may be a relationship between the operation angle and the air-fuel ratio (A/F).

At step S315, ECU 50 directly obtains the correction quantities $\Delta \beta R$ and $\Delta \beta L$ of right and left banks RB and LB from the table of FIG. 21, the air quantities of right and left banks RB and LB obtained at step S313. Further, ECU 50 corrects the operation angles for right and left banks RB and LB on the basis of the correction quantities $\Delta \beta R$ and $\Delta \beta L$. More specifically, the angles of both control shafts 13 are changed.

With this arrangement of the fifth embodiment according to the present invention, it becomes possible to further quickly execute the correction of the operation angles by retrieving the data table, as compared with the correcting operation of the fourth embodiment. Accordingly, it becomes possible to shorten the time period needed for the correcting operation, and to sufficiently suppress the degradation of the energy consumption and the operational stability during the correction operation.

Although the fifth embodiment is arranged so as to refer the table of FIG. 21 which shows the relationship between the operation angle and the intake air quantity under the condition that the engine speed is constant, the water temperature is constant, water-vapor partial pressure, a further complicated mapped data may be employed instead of the table data of FIG. 21 in order to extend the correction execution range. Further, if it is desired to take account of the atmospheric pressure and the water-vapor partial pressure, detectors for detecting such pressures are disposed at an intake air inlet portion, and the data obtained therefrom is employed in the correcting operation. Such correction is well-known, and therefore the explanation thereof is omitted herein.

This application is based on Japanese Patent Applications No. 2001-179630 filed on Jun. 14, 2001 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A control system of an internal combustion engine, comprising:

an operation angle adjustment mechanism continuously varying an operation angle of intake valves of the engine;

an air-fuel ratio detector disposed in an exhaust passage of the engine, the air-fuel ratio detector configured to detect an exhaust parameter indicative of air-fuel ratio information; and a control unit coupled to the operation angle adjustment mechanism and the air-fuel ratio detector, the control unit being programmed, to feedback-control an air-fuel ratio of the engine on the basis of the exhaust parameter;

to correct the operation angle on the basis of the exhaust parameter, wherein the engine comprises a plurality of cylinder trains, the air-fuel ratio detector including cylinder-train air-fuel ratio detectors that detect actual air-fuel ratios of exhaust gases of the respective cylinder trains and an aggregation air-fuel ratio detector that detects an actual air-fuel ratio of aggregated exhaust gas of exhaust gases discharged from the respective cylinder trains, the control unit executing the correction of the operation angle so that the actual air-fuel ratios of the respective cylinder trains are approximately equalized.

2. The control system as claimed in claim 1, wherein the operation-angle adjustment mechanism being installed in each cylinder train, the control unit executing the air-fuel ratio feedback control by each cylinder train.

3. The control system as claimed in claim 1, wherein the air-fuel ratio detector includes an $O_2$ sensor, the control unit calculating a fuel correction quantity by each cylinder train on the basis of the exhaust parameter, the control unit executing the correction of the operation angle during the air-fuel ratio feedback control so that the fuel correction quantities of the plurality of the cylinder trains are substantially equalized.

4. The control system as claimed in claim 1, wherein the air-fuel ratio detector includes a linear type air-fuel ratio sensor which detects an actual air-fuel ratio of exhaust gas, the control unit calculating the correction quantity of the operation angle in a predetermined cylinder train on the basis of the actual air-fuel ratio of the cylinder train and previously stored information indicative of a relationship between the operation angle and the intake air quantity when the feedback control of the air-fuel ratio of the predetermined cylinder train is not executed.

5. The control system as claimed in claim 1, wherein when the feedback control of the air-fuel ratio is not executed, the control unit calculates a correction quantity of a pulse width of fuel injectors in the predetermined cylinder train on the basis of the actual air-fuel ratio and previously stored information indicative of a relationship between the pulse width and the fuel flow rate and corrects the fuel flow rate of the predetermined cylinder train on the basis of the correction quantity of the pulse width.

6. The control system as claimed in claim 1, wherein the control unit determines a relationship as to magnitudes of the operation angles of the respective cylinder trains on the basis of the actual cylinder-train air-fuel ratios, wherein after the control unit executes a first correcting operation of decreasing the largest one of the operation angle, the control unit executes a second correcting operation of increasing the smallest one of the operation angles by a predetermined quantity so that the actual aggregation air-fuel ratio before the first correcting operation is equalized with the actual aggregation air-fuel ratio after the first correcting operation.

7. The control system as claimed in claim 6, wherein the control unit executes the first and second correcting operations when the valve closing timing of the intake valves advances as compared with a bottom dead center and when the valve opening timing approximately corresponds to an upper dead center, the control unit determining that the cylinder train, which causes a relatively large air-fuel ratio, performs a relatively large operation angle, and determining that the cylinder train, which causes a relatively small air-fuel ratio, performs a relatively small operation angle.

8. The control system as claimed in claim 1, wherein the internal combustion engine includes a V-type internal combustion engine comprising two cylinder trains.

9. The control system as claimed in claim 1, further comprising a phase adjustment mechanism for continuously varying a phase of the operation angle of the intake valve relative to a crankshaft of the engine, the control unit feedback-controlling the phase of the operation angle, the control unit executing the correction of the operation angle when the feedback control of the phase is executed.

10. The control system as claimed in claim 1, further comprising a fuel injector coupled to the control unit, the control unit outputting a command signal to the fuel injector according to the exhaust parameter to execute the feedback control of the air fuel.

11. A control system of an internal combustion engine, comprising:

an operation angle adjustment mechanism continuously varying an operation angle of intake valves of the engine;

an air-fuel ratio detector disposed in an exhaust passage of the engine, the air-fuel ratio detector configured to detect an exhaust parameter indicative of air-fuel ratio information; and a control unit coupled to the operation angle adjustment mechanism and the air-fuel ratio detector, the control unit being programmed, to feedback-control an air-fuel ratio of the engine on the basis of the exhaust parameter;

to correct the operation angle on the basis of the exhaust parameter, wherein the engine comprises a plurality of cylinder trains, the operation-angle adjustment mechanism being installed in each cylinder train, the control unit executing the air-fuel ratio feedback control by each cylinder train, wherein the air-fuel ratio detector includes an $O_2$ sensor, the control unit calculating a fuel correction quantity by each cylinder train on the basis of the exhaust parameter, the control unit executing the correction of the operation angle during the air-fuel ratio feedback control so that the fuel correction quantities of the plurality of the cylinder trains are substantially equalized, and wherein the control unit determines which one of the operation angles of the respective cylinder trains is greater than the other of the operation angles, and the control unit decreases the greater operation angle stepwise by a predetermined quantity.

12. The control system as claimed in claim 11, wherein the control unit determines that the cylinder train, which employs a larger fuel correction quantity as compared with the fuel correction quantities of the other cylinder trains, takes a larger operation angle as compared with the operation angles of the other cylinder trains when a valve closing timing of the intake valve advances as compared with a bottom dead center, and the control unit determines that the cylinder train, which employs a smaller fuel correction quantity as compared with the fuel correction quantities of the other cylinder trains, takes a larger operation angle as compared with the operation angles of the other cylinder trains when a valve closing timing of the intake valve retards as compared with the bottom dead center.

13. A control system of an internal combustion engine, comprising:

an operation angle adjustment mechanism continuously varying an operation angle of intake valves of the engine;

an air-fuel ratio detector disposed in an exhaust passage of the engine, the air-fuel ratio detector configured to detect an exhaust parameter indicative of air-fuel ratio information; and a control unit coupled to the operation angle adjustment mechanism and the air-fuel ratio detector, the control unit being programmed, to feedback-control an air-fuel ratio of the engine on the basis of the exhaust parameter;

to correct the operation angle on the basis of the exhaust parameter, wherein the engine comprises a plurality of cylinder trains, the operation-angle adjustment mechanism being installed in each cylinder train, the control unit executing the air-fuel ratio feedback control by each cylinder train, wherein the air-fuel ratio detector includes an $O_2$ sensor, the control unit calculating a fuel correction quantity by each cylinder train on the basis of the exhaust parameter, the control unit decreasing the operation angle of the intake valve in the cylinder train put in the correction control of the operation angle by a predetermined quantity, the control unit calculating a correction quantity of the operation angle during the correction control on the basis of the fuel correction quantity of the cylinder train and previously stored information indicative of a relationship between the operation angle and the intake air quantity.

14. The control system as claimed in claim 13, wherein the control unit executes the correction of the operation angle when the valve closing timing of the intake valve approximately corresponds to the bottom dead center and when the operation angle of the intake valve approximately corresponds to 180° of a crank angle.

15. A control system of an internal combustion engine, comprising:

an operation angle adjustment mechanism continuously varying an operation angle of intake valves of the engine;

an air-fuel ratio detector disposed in an exhaust passage of the engine, the air-fuel ratio detector configured to detect an exhaust parameter indicative of air-fuel ratio information; and a control unit coupled to the operation angle adjustment mechanism and the air-fuel ratio detector, the control unit being programmed, to feedback-control an air-fuel ratio of the engine on the basis of the exhaust parameter;

to correct the operation angle on the basis of the exhaust parameter, wherein the engine comprises a plurality of cylinder trains, the operation-angle adjustment mechanism being installed in each cylinder train, the control unit executing the air-fuel ratio feedback control by each cylinder train, wherein the control unit calculating a fuel correction quantity by each cylinder train on the basis of the exhaust parameter, the control unit decreases the operation angle of the intake valve in the cylinder train put in the correction control of the operation angle to a predetermined angle, and the control unit calculates a correction quantity of the operation angle during the correction control on the basis of the fuel correction quantity in the cylinder train and previously stored information indicative of a relationship between the operation angle and the intake air quantity.

16. A control system of an internal combustion engine, comprising:

an operation angle adjustment mechanism continuously varying an operation angle of intake valves of the engine;

an air-fuel ratio detector disposed in an exhaust passage of the engine, the air-fuel ratio detector detecting an exhaust parameter indicative of air-fuel ratio information; and a control unit coupled to the operation angle adjustment mechanism and the air-fuel ratio detector, the control unit being programmed, to feedback-control an air-fuel ratio of the engine on the basis of the exhaust parameter;

to correct the operation angle on the basis of the exhaust parameter;

wherein the operation-angle adjustment mechanism comprises a drive shaft interlocked with a crankshaft of the engine, a swing cam rotatably connected with the drive shaft and driving the intake valve, a drive cam integrally connected to the drive shaft, an axial center of the drive cam being eccentric from an axial center of the drive shaft, a first link rotatably connected with an outer periphery of the drive cam, a control shaft rotatably supported by the engine, a control cam integrally connected to the control shaft, an axial center of the control cam being eccentric from an axial center of the control shaft, a locker arm rotatably connected with the outer periphery of the control cam, a first end portion of the locker arm interlocking with an end portion of the first link, a second link having a first end portion interlocking with the second end portion of the locker arm, and a second end portion interlocking with the swing cam, wherein the correction of the operation angle is executed by rotating the control shaft.

17. A method for controlling an internal combustion engine, the internal combustion engine comprising a plurality of cylinder trains, an operation-angle adjustment mechanism for continuously varying an operation angle of an intake valve and an air-fuel ratio detector detecting an exhaust parameter indicative of air-fuel ratio information, the method comprising:

feedback-controlling an air-fuel ratio of the engine on the basis of the exhaust parameter;

correcting the operation angle on the basis of the exhaust parameter;

detecting actual air-fuel ratios of exhaust gases of the respective cylinder trains;

detecting an actual air-fuel ratio of aggregated exhaust gas of exhaust gases discharged from the respective cylinder trains; and executing the correction of the operation angle so that the actual air-fuel ratios of the respective cylinder trains are approximately equalized.

18. A control system of an internal combustion engine which comprises a plurality of cylinder trains, comprising:
   operation-angle varying means for continuously varying an operation angle of intake valves of the engine;
   air-fuel ratio detecting means for detecting an exhaust parameter indicative of air-fuel ratio information;
   cylinder-train air-fuel ratio detecting means for detecting actual air-fuel ratios of exhaust gases of the respective cylinder trains;
   aggregation air-fuel ratio detecting means for detecting an actual air-fuel ratio of aggregated exhaust gas of exhaust gases discharged from the respective cylinder trains;
   air-fuel ratio controlling means for feedback-controlling an air-fuel ratio of the engine on the basis of the exhaust parameter;
   operation-angle correcting means for correcting the operation angle on the basis of the exhaust parameter; and
   correction executing means for executing the correction of the operation angle so that the actual air-fuel ratios of the respective cylinder trains are approximately equalized.

19. An internal combustion engine having a first cylinder train and a second cylinder train, the engine comprising:
   an intake air passage through which intake air to all of cylinders of the engine passes;
   an airflow meter that detects a quantity of air passing through the intake air passage;
   a first exhaust passage through which exhaust gas discharged from cylinders of the first cylinder train passes;
   a second exhaust passage through which exhaust gas discharged from cylinders of the second cylinder train passes;
   a first air-fuel ratio sensor disposed in the first exhaust passage, the first air-fuel ratio sensor detecting a parameter indicative of an air-fuel ratio of the exhaust gas passing through the first exhaust passage;
   a second air-fuel ratio sensor disposed in the second exhaust passage, the second air-fuel ratio sensor detecting a parameter indicative of an air-fuel ratio of the exhaust gas passing through the second exhaust passage;
   a first operation angle adjustment mechanism continuously adjusting an operation angle of an intake valve of each cylinder of the first cylinder train;
   a second operation angle adjustment mechanism continuously adjusting an operation angle of an intake valve of each cylinder of the second cylinder train; and
   a controller programmed,
      to calculate a basic fuel quantity on the basis of the air quantity detected by the airflow meter,
      to calculate a first fuel correction quantity on the basis of the parameter detected by the first air-fuel sensor,
      to calculate a fuel quantity supplied to the cylinders of the first cylinder train on the basis of the basic fuel quantity and the first fuel correction quantity,
      to calculate a second fuel correction quantity on the basis of the parameter detected by the second air-fuel sensor,
      to calculate a fuel quantity supplied to the cylinders of the second cylinder train on the basis of the basic fuel quantity and the second fuel correction quantity, and
      to control at least one of the first operation angle adjustment mechanism and the second operation angle adjustment mechanism so as to decrease a difference between the first fuel correction quantity and the second fuel correction quantity.

20. The control system as claimed in claim 19, wherein the control unit is further programmed to calculate a difference between the first fuel correction quantity and the second fuel correction quantity, and to decrease the difference by selecting one of the first operation angle adjustment mechanism and the second operation angle adjustment mechanism and by controlling the selected one of the first operation angle adjustment mechanism and the second operation angle adjustment mechanism.

21. The control system as claimed in claim 19, wherein the control unit is further programmed to calculate a difference between the first fuel correction quantity and the second fuel correction quantity only when at least one predetermined engine operating parameter is satisfied.

* * * * *